Sept. 11, 1945.    R. GUNN ET AL    2,384,463
FUEL CELL
Filed Dec. 6, 1938    13 Sheets-Sheet 1
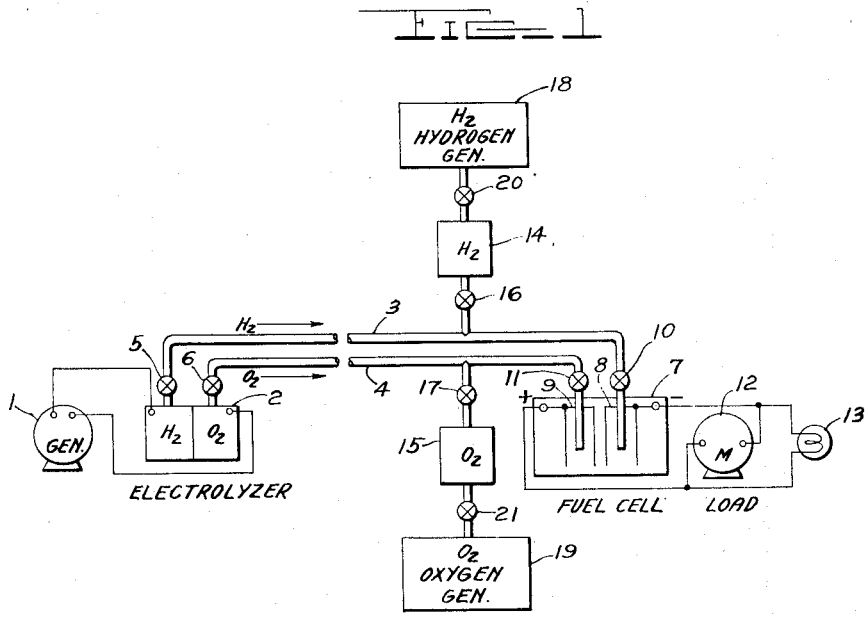
INVENTOR
Ross Gunn
Wayne C. Hall
BY
ATTORNEY

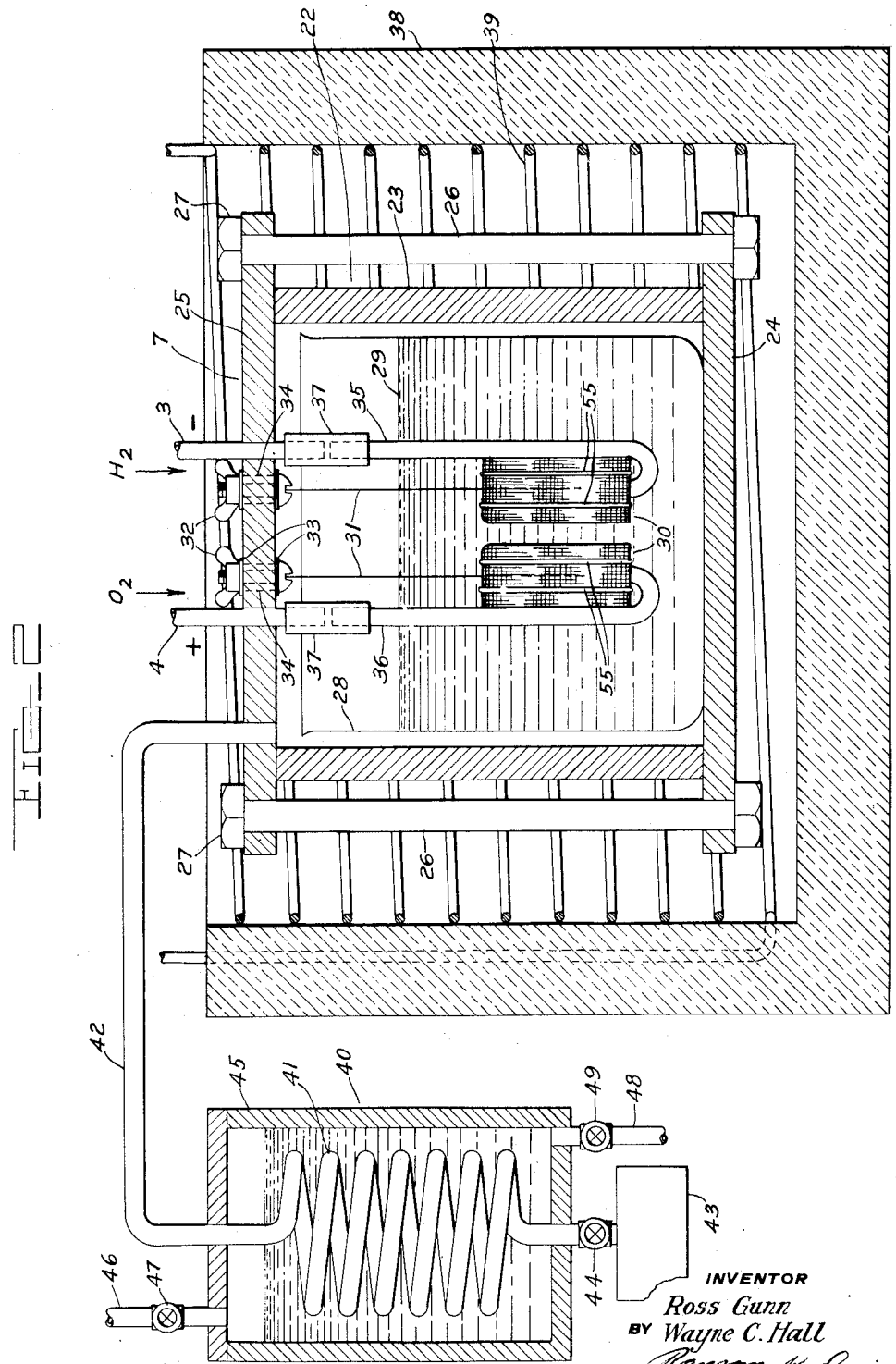

Sept. 11, 1945.  R. GUNN ET AL  2,384,463
FUEL CELL
Filed Dec. 6, 1938  13 Sheets-Sheet 3
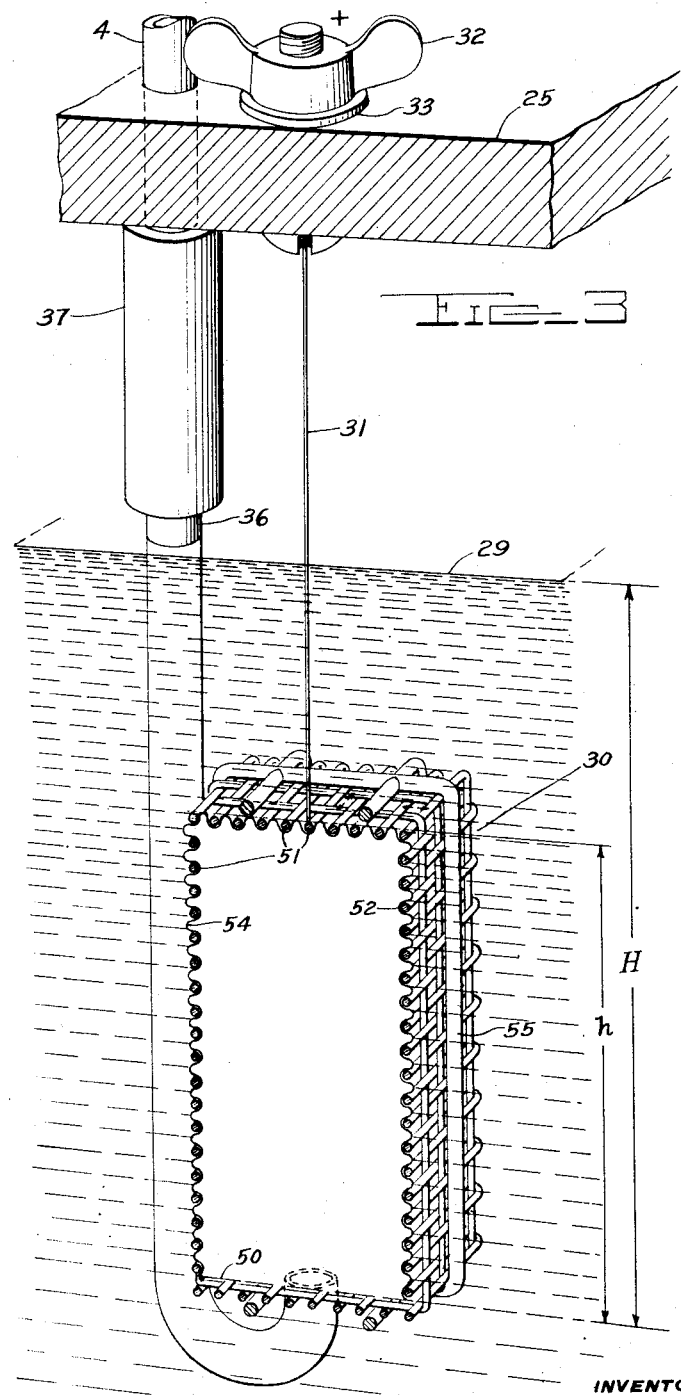
INVENTOR
Ross Gunn
BY Wayne C. Hall
ATTORNEY Sept. 11, 1945. R. GUNN ET AL 2,384,463
FUEL CELL
Filed Dec. 6, 1938 13 Sheets-Sheet 4
FIG_4
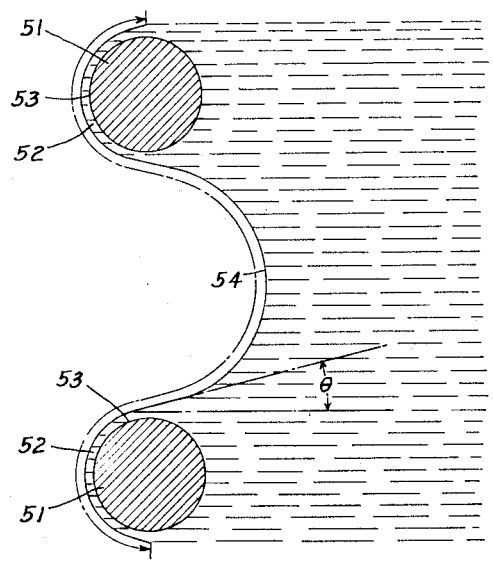
FIG_5
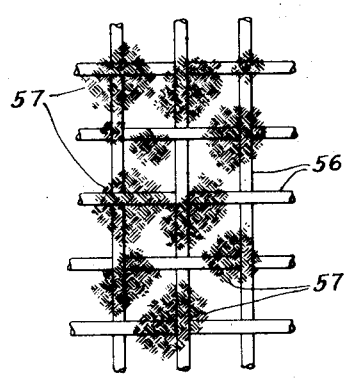
FIG_6
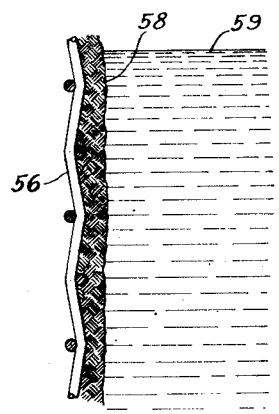
INVENTOR
Ross Gunn
Wayne C. Hall
BY
ATTORNEY Sept. 11, 1945.  R. GUNN ET AL  2,384,463
FUEL CELL
Filed Dec. 6, 1938  13 Sheets-Sheet 5
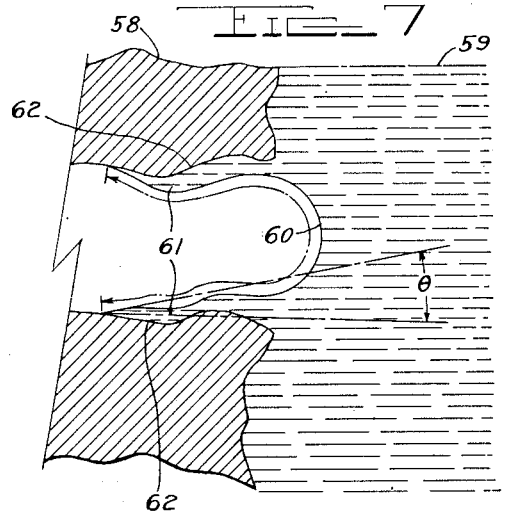
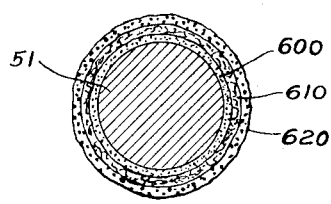
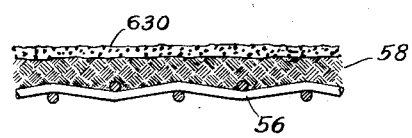
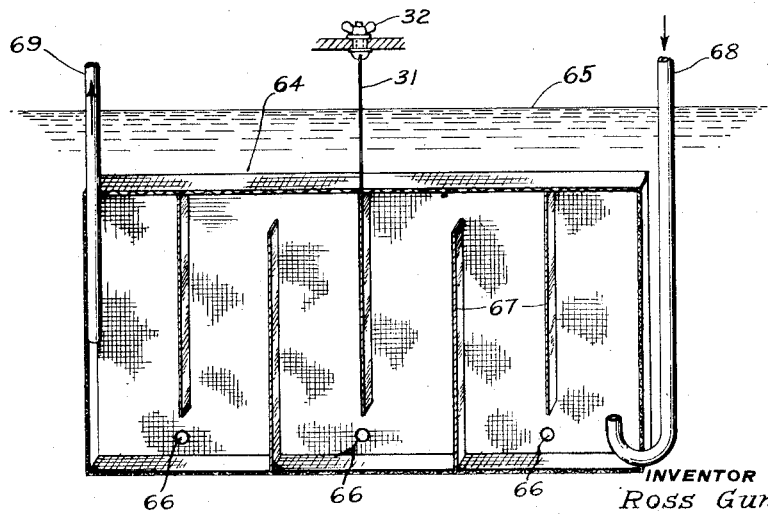
INVENTOR
Ross Gunn
Wayne C. Hall
BY
Ransom K. Davis
ATTORNEY

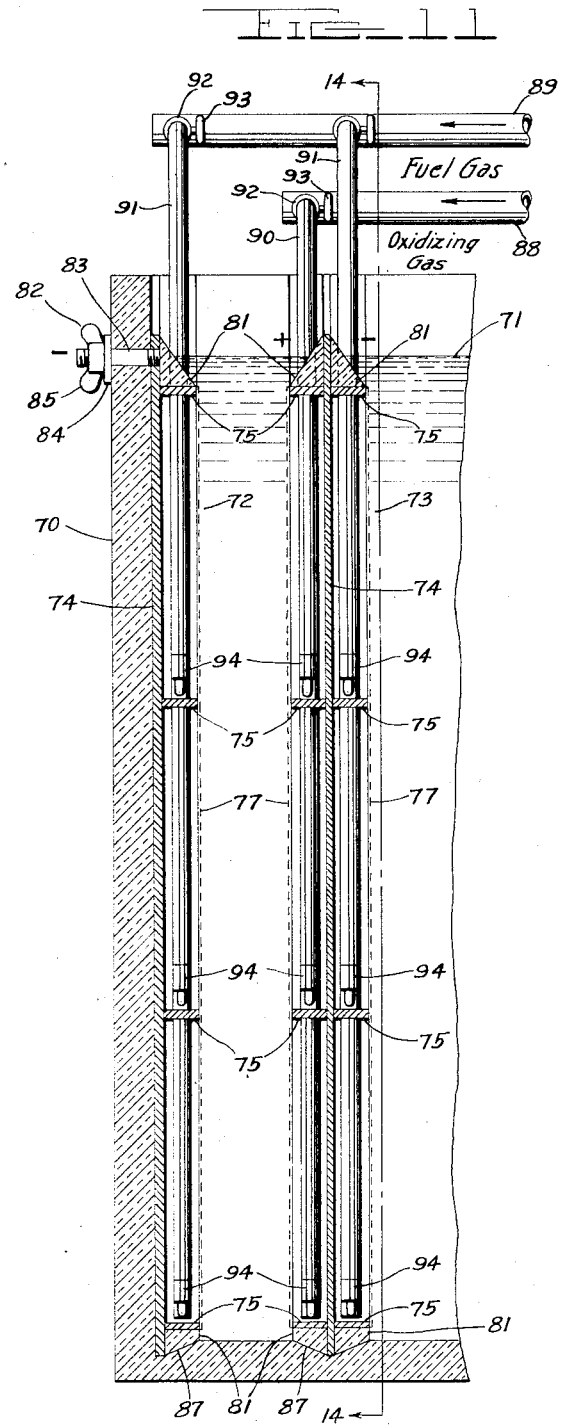

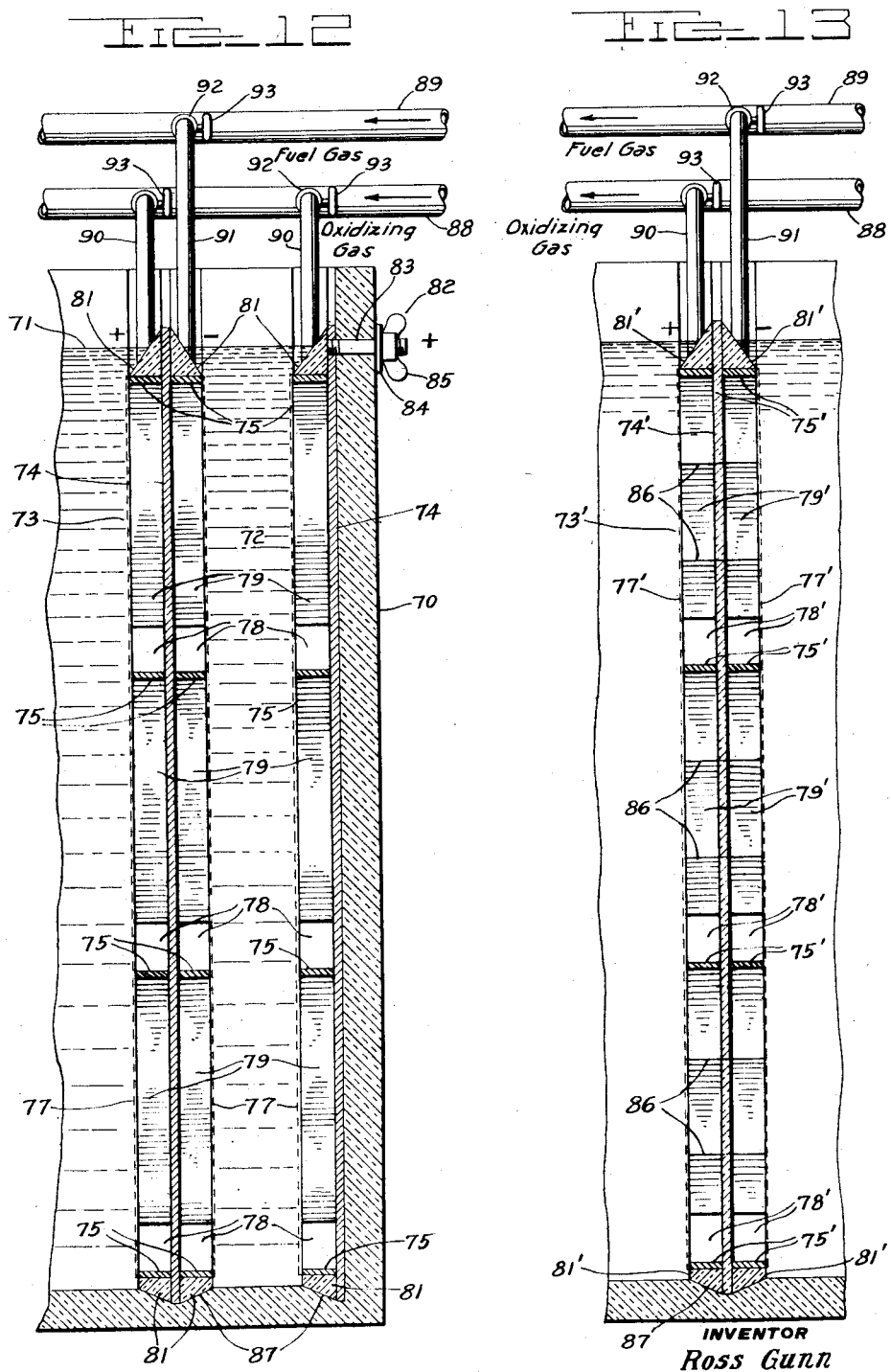

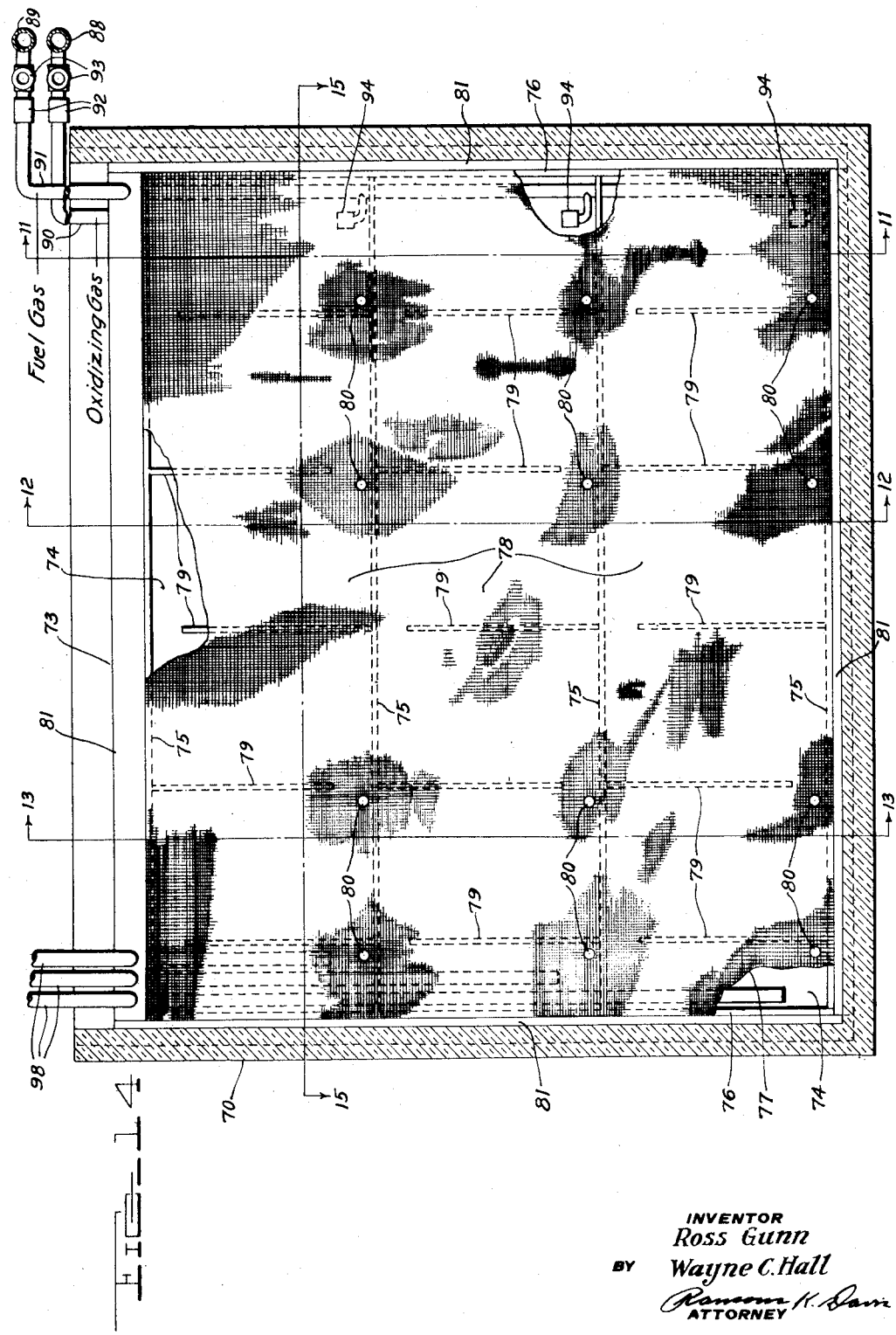

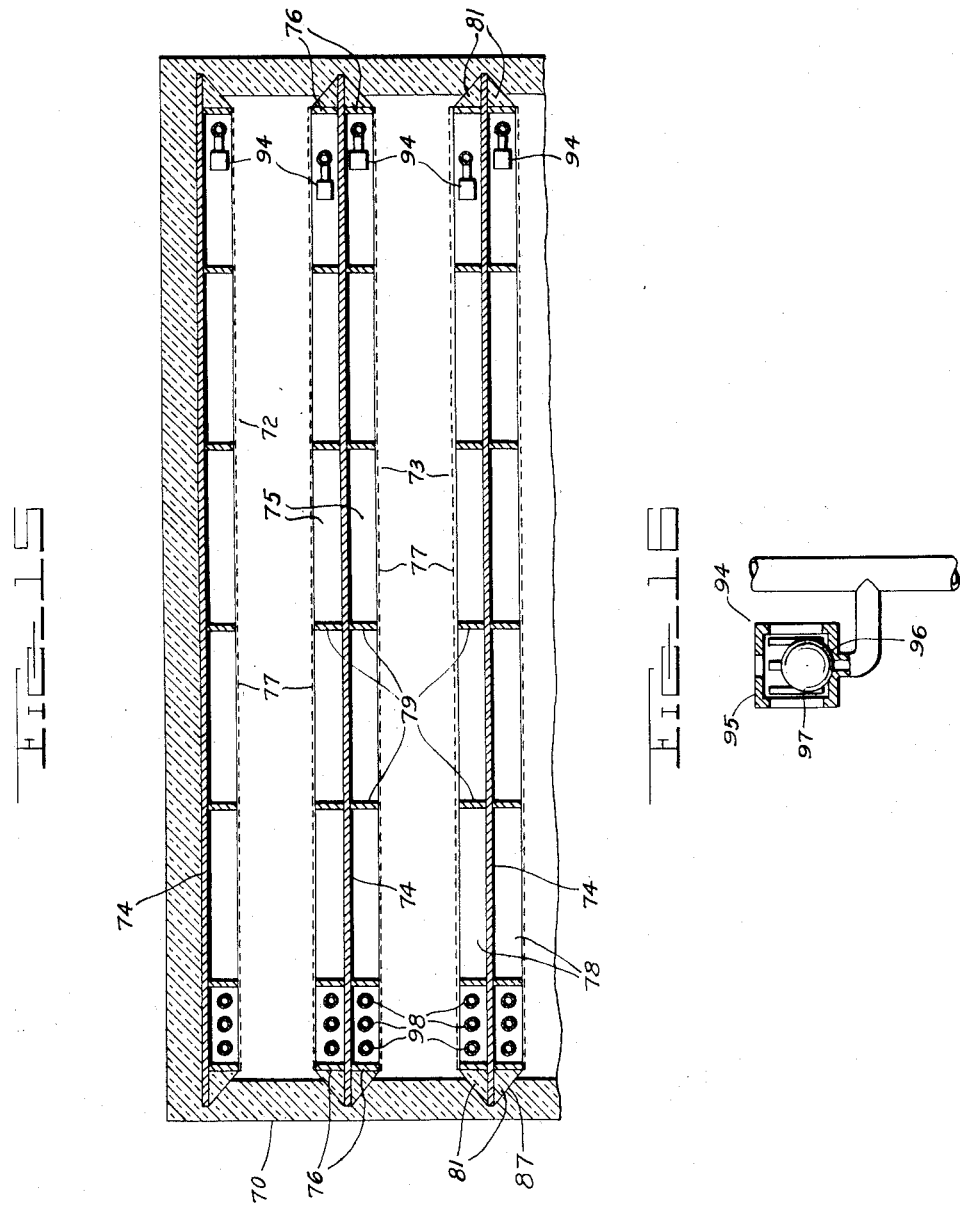

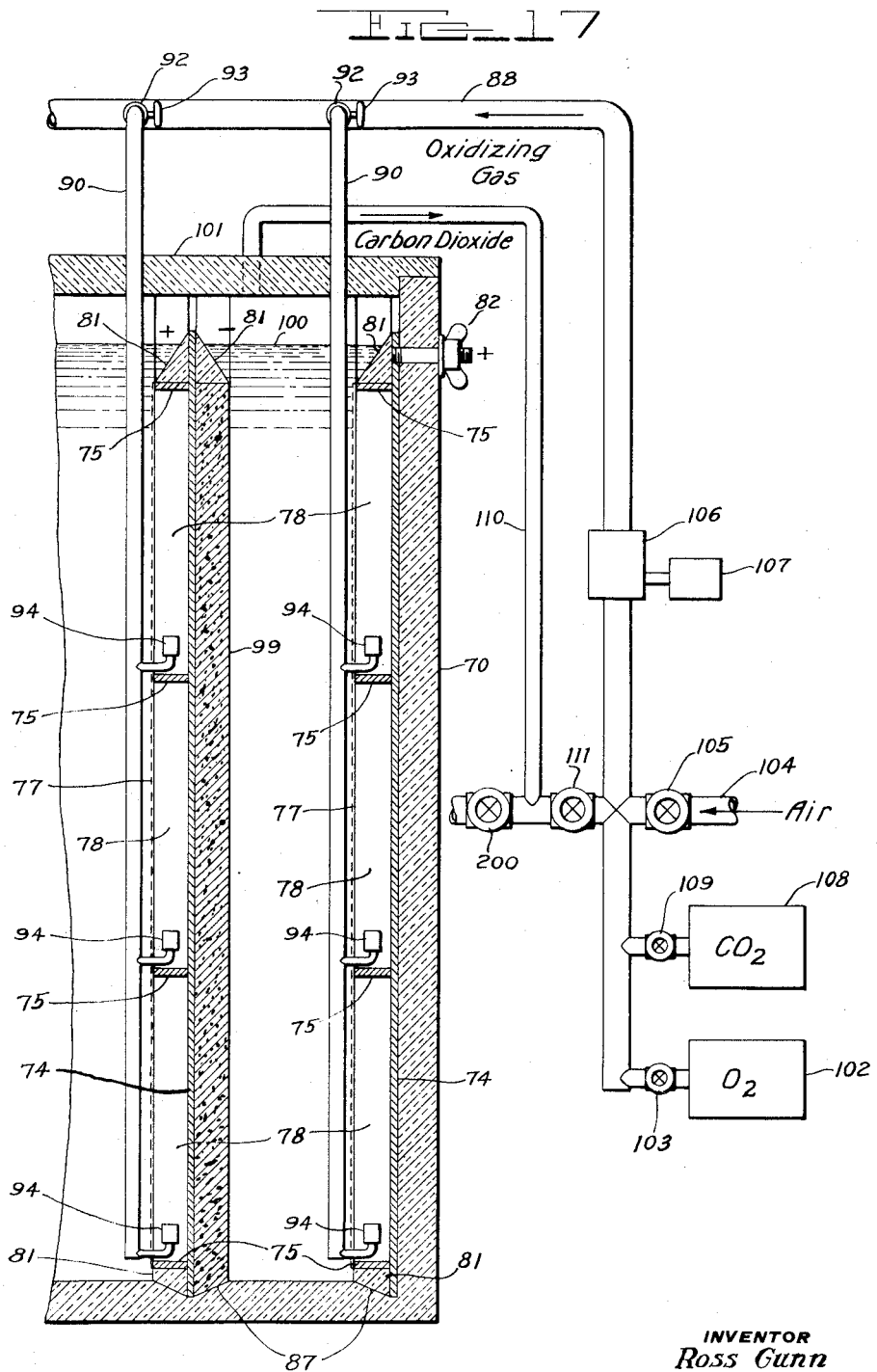

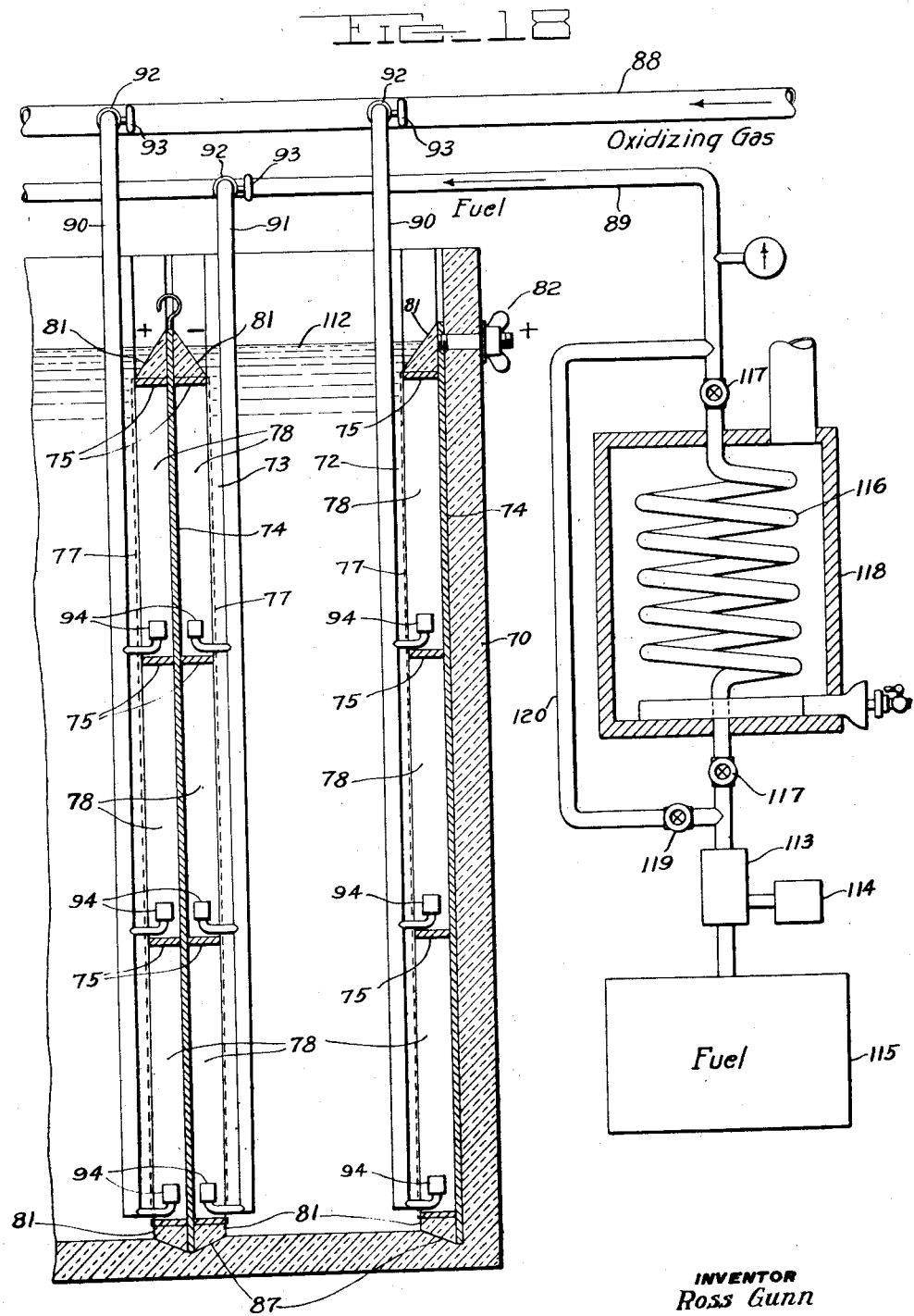

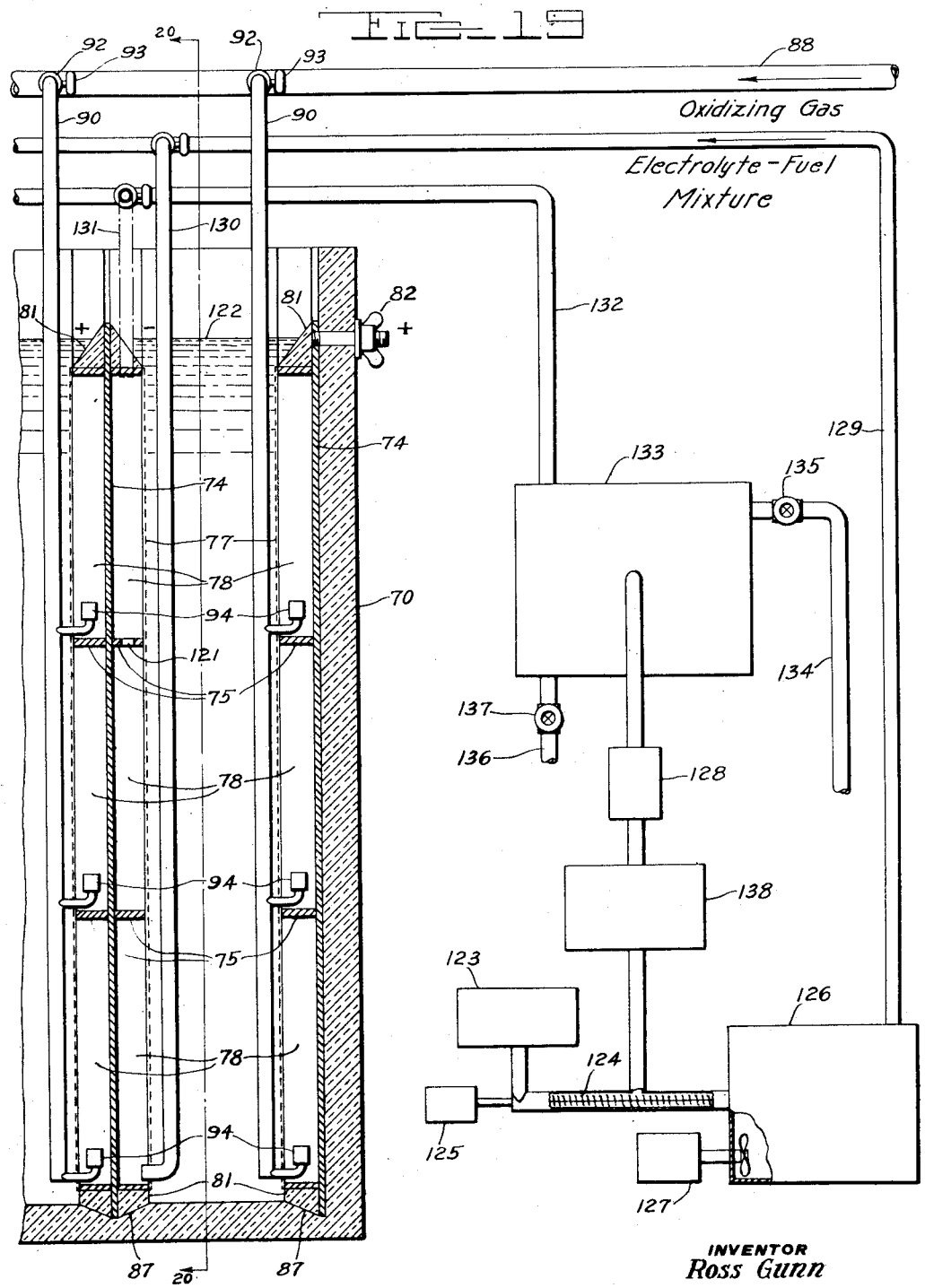

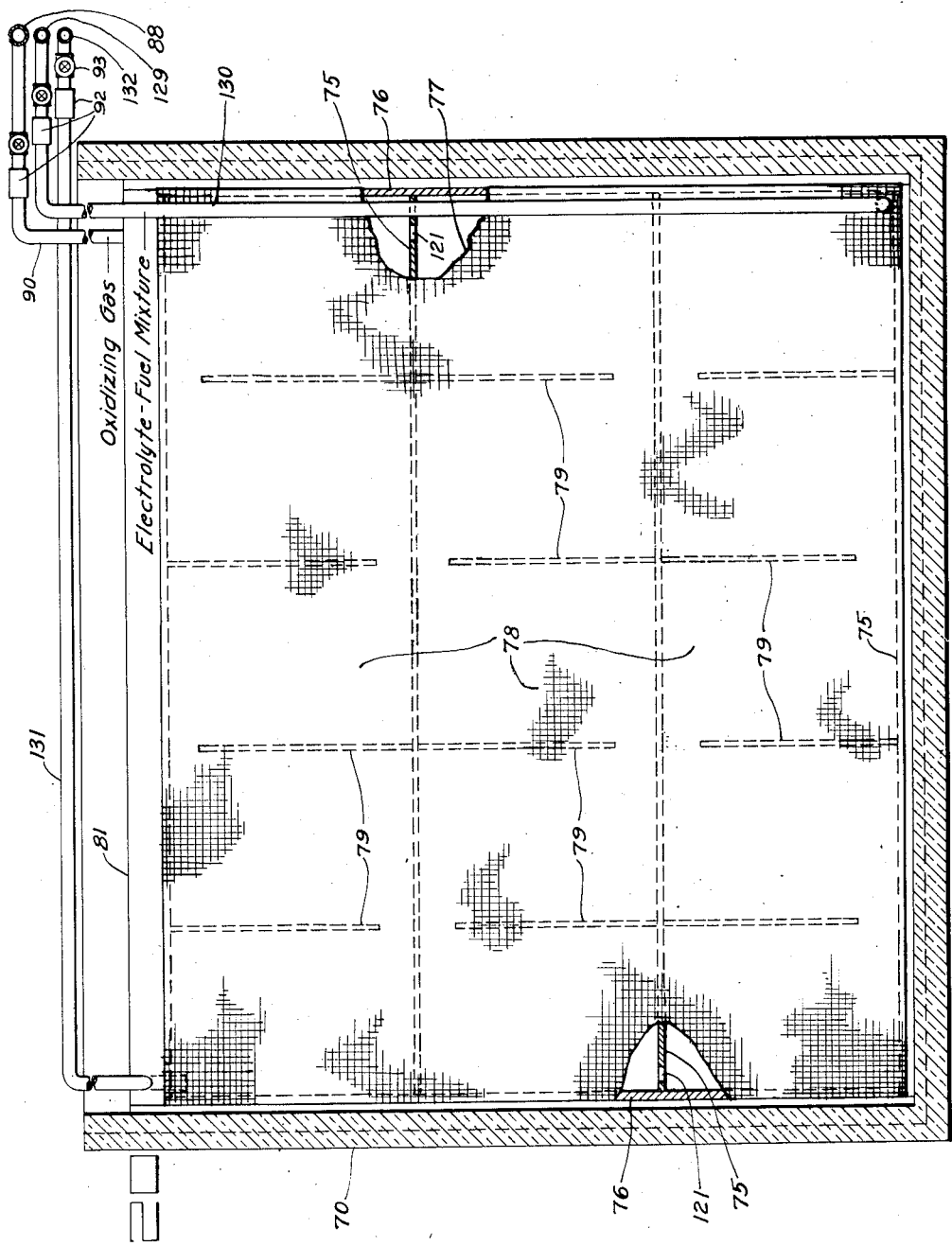

Patented Sept. 11, 1945

2,384,463

UNITED STATES PATENT OFFICE 2,384,463

FUEL CELL

Ross Gunn and Wayne C. Hall, Washington, D. C.

Application December 6, 1938, Serial No. 244,204

30 Claims. (Cl. 136—86)

(Granted under the act of March 3, 1883, as amended April 30, 1928; 370 O. G. 757)

Our invention relates to apparatus and methods for the conversion of the free energy of combustion of fuels into electrical energy by electrochemical reaction. Broadly the invention seeks to improve the fuel cells now in use, the electrode structure thereof and the methods of fuel supply, energy conversion and depolarization.

The fuel cell, as is well known, is based on the observation made many years ago that electrolytic processes under definite conditions are reversible. While many attempts have been made to increase the rates of electrochemical reaction in these cells so as to make them thoroughly practicable, these efforts, in so far as we are aware, have to date met with little success. It is a fundamental principle in the design of fuel cells that the rate of electrochemical reaction therein depends on the area within the cell that is simultaneously exposed to the conducting electrode, the electrolyte and the fuel gas. How to obtain this mutuality of contact over the requisite area so as to achieve practicable rates of electrochemical reaction has been one of the many problems with which the art has long been confronted. This desideratum, in accordance with the present invention, has been effectually attained by the utilization of the phenomenon of surface tension at the electrode surface within the cell.

In the solution of this problem we employ a foraminous electrode of proper design and dispose exteriorly thereof an electrolyte that wets the same to provide at the surface thereof a thin electrolytic film through which adjacent gas may readily diffuse to the electrode electrolyte interface to insure the aforesaid mutuality of contact thereat. A gas is disposed interiorly of the electrode and forms with the electrolyte at foramina of the electrode a gas-electrolyte interface. This gas-electrolyte interface is preserved in equilibrium by the forces of surface tension acting at the electrode, thus insuring the maintenance of the electrolytic film at the electrode foramina. Since the electrode is provided with a multiplicity of foramina the total electrode surface covered by the electrolytic film is of necessity of considerable compass resulting in mutuality of contact between the electrode, electrolyte and gas over extended areas and the achievement of practicable rates of electrochemical reaction.

Another essential characteristic of a fuel cell, if it is to be practicable, is that it have a low internal resistance. This is particularly important and becomes increasingly difficult of attainment in fuel cells wherein a large number of electrodes is employed to obtain the desired electromotive force. This problem we have likewise solved by disposing intermediate the electrodes of opposing polarity of a fuel cell a plurality of electrodes that are in electrical communication solely within the cell. Any pair of intermediate low resistance coupled electrodes may optionally be removed from the cell without destroying the operativeness thereof, though in so doing the voltage of the cell is somewhat reduced. This latter feature is of advantage when it becomes necessary for any reason to replace or repair any electrode of the cell.

Even though a fuel cell have high rates of electrochemical reaction and a low internal resistance, there still remains the problem of polarization which must be effectively dealt with if the cell is to be thoroughly practicable. Our researches show that in those cells wherein a molten electrolyte is employed, serious polarization occurs at the oxygen electrode. This polarization, in so far as we are aware, is directly attributable to the progressive formation of metallic oxides at the oxygen electrode which impair and inhibit the electrochemical reaction which normally occurs thereat. We have discovered that depolarization at the oxygen electrode can be successfully achieved if moderate amounts of carbon dioxide, however obtained, are supplied the electrode in question along with the oxidizing gas. This has the beneficial effect of converting the oxides contiguous to the electrode into carbonates thus effectually eliminating the polarization thereat. If the electrolyte within the cell is one that dissociates into carbonate anions, the carbon dioxide generated by the cell may conveniently, but not necessarily, be utilized as the depolarizing gas.

Having developed a thoroughly practicable fuel cell which can efficiently convert the energy of fuels into electrical energy, we have in addition devised methods and instrumentalities for making available as fuel organic or carbonaceous materials, whether solid, liquid or gaseous and whether occurring in a prepared, semi-prepared or wholly natural state, for electrochemical consumption within the fuel cell. Where the organic material has been susceptible of being decomposed by heat to yield at least one of the end products of the group consisting of carbon, hydrogen and carbon monoxide, we have resorted to the wholly novel expedient of decomposing the fuel either exteriorly or interiorly of the cell and of supplying one or more electrodes thereof with at least one of the aforesaid end products for electrochemical consumption thereat. Where, on the other hand, the carbonaceous material has been available in a comminuted form, the method of fuel supply and apparatus for carrying the same into effect have in accordance with the present invention involved mixing the comminuted material with a suitable fluid medium and supplying the resultant mixture to one or more electrodes of the fuel cell for the electrochemical combustion thereat of the fuel suspended therein. If this latter method of fuel supply is to be continuous in nature any residue in the fluid medium consequent upon combustion may be removed and new fuel material mixed with the fluid medium for further combustion at the electrode.

Finally, we have devised a new and novel method of energy conversion which has general application in the field of electrochemistry and by means of which the free energy of a gas may by electrochemical reaction be converted directly into electrical energy. This method essentially comprises diffusing the gas through a thin film of electrolyte to an electrically conductive surface where by virtue of mutuality of contact over requisite areas high rates of electrochemical reaction ensue.

In the light of the foregoing it is among the principal objects of our invention to provide a fuel cell which by utilization of the phenomenon of surface tension is capable of high rates of electrochemical reaction; to provide a fuel cell of low internal resistance; to provide new and novel electrode structures and methods of fabricating the same for carrying the foregoing and other objects into effect; to provide a method of depolarization at the oxygen electrode of a fuel cell which by the employment of carbon dioxide effectively depolarizes the same; to provide methods and apparatus for supplying a fuel cell with fuel decomposed by heat or with mixtures of a fluid medium and comminuted fuel for electrochemical consumption of the fuel thereat; and to provide a method of converting the free energy of reaction of a gas into electrical energy at an electrically conductive surface by diffusing the said gas through a thin film of electrolyte in contiguous relation thereto.

Other objects and many of the attendant advantages of this invention will be readily appreciated as the same becomes better understood by reference to the following detailed description when considered in connection with the accompanying sheets of drawings wherein:

Fig. 1 is a diagrammatic representation of a system for the transmission and/or storage of energy in which our novel fuel cell may be advantageously employed;

Fig. 2 depicts one embodiment of the fuel cell of the present invention with associated instrumentalities;

Fig. 3 is a view in sectional elevation on an enlarged scale depicting the structure of the reticulated foraminous electrodes in the cell of Fig. 2 and showing the progressive increase in distortion of the gas-electrolyte interface caused by the progressively increasing pressure differential along the electrode surface;

Fig. 4 is a schematic enlargement depicting one of the gas-electrolyte interfaces of the electrode of Fig. 3 and the thin films of electrolyte in contact with the electrode surface through which adjacent gas diffuses to the electrode-electrolyte interface;

Fig. 5 shows the initial step in the fabrication of the sintered foraminous electrode wherein metalliferous particles are spread in a layer over a reticulated electrically conductive base member prior to the sintering step;

Fig. 6 shows a fragmentary view in cross sectional elevation of the porous sintered electrode as used in a fuel cell;

Fig. 7 is a fragmentary cross sectional view on an enlarged scale of the sintered porous electrode showing one of the gas-electrolyte interfaces and the thin film of electrolyte at the electrode surface through which adjacent gas diffuses to the electrode-electrolyte interface;

Fig. 8 depicts in cross section one of the conductors of the foraminous reticulated electrode provided with a catalytic coating;

Fig. 9 is a fragmentary cross sectional view of the foraminous sintered electrode likewise provided with a catalytic coating;

Fig. 10 discloses in sectional elevation a novel electrode structure which may be advantageously employed for the continuous consumption of a fuel or oxidizing gas and from one end of which any unconsumed portion thereof may be vented;

Fig. 11 is a fragmentary longitudinal cross sectional view in elevation of that embodiment of our fuel cell which has a low internal resistance taken on the line 11—11 of Fig. 14 and showing the cell end portion of negative polarity;

Fig. 12 is likewise a fragmentary longitudinal cross sectional view in elevation of the fuel cell of low internal resistance but taken on the line 12—12 of Fig. 14 and showing the cell end portion of positive polarity;

Fig. 13 is a fragmentary longitudinal cross sectional view taken on the line 13—13 of Fig. 14 depicting a medial portion of the low internal resistance cell wherein a modified electrode structure is employed;

Fig. 14 is a view in transverse cross section of the cell having a low internal resistance and taken on the line 14—14 of Fig. 11;

Fig. 15 is a fragmentary cross sectional view taken on the line 15—15 of Fig. 14 showing the manner of mounting the ends of a single electrode and of an electrode pair in the cell casing;

Fig. 16 discloses a valve that may be employed in the various fuel cells for automatically controlling the admission of gas to any of the electrodes;

Fig. 17 is a partial cross sectional view in elevation of another embodiment of our fuel cell employing an electrode of carbonaceous material and wherein depolarization is achieved at the oxygen electrode by the introduction there of carbon dioxide;

Fig. 18 is a diagrammatic representation of an apparatus wherein fuels decomposed by heat are supplied to a fuel cell for electrochemical consumption thereat;

Fig. 19 shows schematically an arrangement of various instrumentalities for supplying a fuel cell with a comminuted fuel; and Fig. 20 is a view in transverse cross section of the fuel cell taken on the line 20—20 of Fig. 19.

Before proceeding with a detailed description of the various embodiments of our invention certain remarks having general application to our novel fuel cells will first be made with a view to avoiding needless repetition in subsequent parts of the specification and for the purpose of insuring clarity of exposition. These remarks are directed principally to the electrolytes employable in the various fuel cells, the fuels that may be used in conjunction therewith, typical electrochemical reactions that occur in the cells resulting in the conversion of the free energy of combustion of the fuels into electrical energy, and operating conditions as regards pressure and temperature.

ELECTROLYTES

The attributes or essential characteristics of any electrolyte that may be used in our fuel cells, irrespective of the fuel consumed therein, are that the electrolyte be such that it is not consumed unless perhaps it is exceptionally cheap; that it preferably be such as not to change permanently its chemical composition in service; that it be of such a character as not to react with or corrode to an impracticable extent the component parts of the cell; that it be such as not to readily evaporate under the operating conditions; and that it have good electrical conductivity. Where the fuels to be consumed are gaseous the electrolyte, in addition to the foregoing requirements, must be capable of dissolving the gases in the un-ionized state; and must not react directly to any appreciable extent with the free or un-ionized fuel gases. Thus any of the prior art aqueous, non-aqueous or fused salt electrolytes that embody the foregoing characteristics may advantageously be utilized in the various fuel cells of the present invention.

As illustrative of certain classes of aqueous electrolytes that can with advantage be employed, there may be mentioned those strong bases which in the process of dissociation produce large numbers of hydroxyl ions; and particularly the alkali hydroxides of which LiOH, KOH and NaOH are representative. Among the acid electrolytes, aqueuos solutions of $H_2SO_4$ and HCl have been found to be suitable in some cases.

Among the fused salt electrolytes we have found the carbonates to be eminently suited for the purposes at hand; and this is particularly so when the electrolyte includes at least a carbonate of the alkali or alkaline earth metals. Thus a single carbonate of the alkali or alkaline earth metals may comprise the electrolyte or various mixtures of the carbonates of the alkali and/or alkaline earth metals may be used for this purpose. To either a single carbonate of the alkali or alkaline earth metals or to mixtures of the carbonates of the alkali and/or alkaline earth metals there may be added, if desired, a halide salt of an alkali metal or alkaline earth metal or mixtures of halide salts of the alkali and/or alkaline earth metals. Various mixtures of carbonates and/or halide salts as well as proportions thereof by weight or volume may be employed and will readily suggest themselves to those skilled in the art. The following table of mixtures with melting points is given by way of example:

in a gaseous, solid or liquid form and in either a prepared, semi-prepared or natural state. When gases or vapors are to be utilized as a fuel it is essential that the free energy evolved by a combination of the gases or vapors to form a compound or compounds, be large and exothermic since otherwise the energy output of the cell will be low. Furthermore, the gases or vapors must ionize readily under the operating conditions of the cell and be stable so that they may be readily stored. The organic fuels, regardless of their form or state, are particularly suited for use with the cells of our invention. Where these fuels are in a state such that they can be electrochemically consumed they can, of course, be directly introduced into the fuel cell. Otherwise, organic fuels must be employed that are susceptible of being decomposed by heat to yield at least one of the end products of the group consisting of carbon, hydrogen and carbon monoxide.

By the term "gas" as employed in the specification and claims is meant any element or compound, mixtures of elements or mixtures of compounds, or mixtures of one or more elements with one or more compounds all in a vaporous and/or gaseous state. Thus an oxidizing gas in conformity with the above definition might be either chlorine, pure oxygen or oxygen mixed with other elements or compounds such as air, for example. Of the gaseous fuels that may be employed hydrogen, carbon monoxide, methane, ethane, propane, butane, iso-butane, water gas, producer gas, illuminating gas and natural gas may be taken as illustrative. As exemplifying liquid fuels the following may be used, namely, petroleum, the many derivatives and products thereof; and the broad class of hydrocarbons and the oxygenated derivatives thereof such as the alcohols, of which ethyl and methyl alcohol are the most readily available, all within the limitations set forth in the preceding paragraph. Of the class of solid fuels that may be utilized, organic or carbonaceous materials in either integral or comminuted form are considered illustrative. As typifying these latter materials coke, coal, carbon and petroleum residues may be mentioned.

TYPICAL ELECTROCHEMICAL REACTIONS

In order that it may be understood how the free energy of combustion of the fuels is converted into electrical energy, certain typical electrochemical reactions will be considered. The reactions that will be stated are the principal ones that occur at the electrodes of opposing polarity and are of necessity the over-all reactions since the detailed chemical reactions are as yet not completely known. Four cases will

|  | In percent by weight | | | | | | | | | |
| --- | --- | --- | --- | --- | --- | --- | --- | --- | --- | --- |
|  | I | II | III | IV | V | VI | VII | VIII | IX | X |
| $BaCO_3$ | 27.4 | 37.2 |  |  | 35.4 |  |  |  | 9.1 | 30.0 |
| $CaCO_3$ |  |  |  |  | 4.8 |  |  |  |  |  |
| $Na_2CO_3$ | 10.0 | 10.4 | 22.8 | 13.5 | 9.9 | Added | 31.3 | 42.4 | 28.4 | 35.0 |
| $K_2CO_3$ | 23.5 | 17.3 | 43.4 | 57.0 | 16.5 | to | 40.7 | 26.2 | 37.0 | 35.0 |
| $KF.2H_2O$ | 27.6 | 28.0 | 8.6 |  | 26.6 | Column I |  |  |  |  |
| NaF |  |  | 4.2 | 8.1 |  |  |  |  |  |  |
| $BaCl_2 2H_2O$ | 11.5 |  |  |  |  |  |  |  |  |  |
| KCl |  | 7.1 | 21.0 | 21.4 | 6.8 |  | 15.7 | 31.4 | 14.3 |  |
| KBr |  |  |  |  |  | 1.0 |  |  |  |  |
| NaCl |  |  |  |  |  |  | 12.3 |  | 11.2 |  |
| Melting point, °C | 475 | 475 | 510 | 510 | 465 | 470 | 557 | 557 | 547 | 650 |

FUELS

The fuels that may be variously employed in conjunction with our fuel cells may be either be discussed in each of which oxygen is, by way of example, introduced at one of the electrodes, since oxygen will perhaps be used in the majority of cases because of its general availability. The oxygen electrode of the fuel cell is always the electrode of positive polarity and the remaining electrode, at which in the cases under consideration either carbon, hydrogen or carbon monoxide is consumed, is the electrode of negative polarity. Where oxygen is employd at one of the electrodes, it is essential that the electrolyte be one that dissociates into oxygen-bearing anions, since the electrolyte through electrochemical reaction must transfer in an ionized state the oxygen at the electrode of positive polarity to the fuel at the electrode of negative polarity for oxidizing the same. This process of oxidation at the electrode of negative polarity is accomplished by the oxygen-bearing anion.

The first case that will be considered is that in which oxygen and hydrogen are the gases and the electrolyte is fused sodium carbonate. The carbonate, of course, dissociates into $Na^+$ ions and $CO_3^{--}$ ions. The over-all reactions that are involved are set forth in the following equations:

CASE 1

*Reaction at the electrode of positive polarity*

$$\tfrac{1}{2}O_2 + 2Na^+ \longrightarrow Na_2O + 2\oplus \qquad \text{Eq. (1)}$$

*Reaction at the electrode of negative polarity*

$$H_2 + CO_3^{--} \longrightarrow CO_2 + H_2O + 2\ominus \qquad \text{Eq. (2)}$$

*Equation of regeneration*

$$Na_2O + CO_2 \longrightarrow Na_2CO_3 \qquad \text{Eq. (3)}$$

At the electrode of positive polarity the oxygen in an ionized state reacts electrochemically with the sodium ion forming neutral sodium oxide and leaving the electrode positively charged. At the electrode of negative polarity, on the other hand, the hydrogen also in an ionized state is oxidized by the carbonate ion resulting in the evolution of carbon dioxide, the formation of water and the liberation of a negative charge at the electrode. A partial regeneration of the electrolyte occurs by the chemical combination of the sodium oxide and carbon dioxide as indicated by the reaction in Eq. 3. Since by far the greater portion of the carbon dioxide evolved at the electrode of negative polarity escapes, it follows that the cell ultimately becomes polarized at the oxygen electrode by reason of the accumulation thereat of sodium oxide. If, now, the electrodes of opposing polarity are connected in a circuit electrical energy will be dissipated. Thus it follows that the free energy of combustion of the fuels has been converted into electrical energy.

In the next case oxygen and carbon monoxide are taken as the fuels, sodium carbonate being retained as the electrolyte in the interest of simplicity. The equations involved are as follows:

CASE 2

*Reaction at the electrode of positive polarity*

$$\tfrac{1}{2}O_2 + 2Na^+ \longrightarrow Na_2O + 2\oplus \qquad \text{Eq. (1)}$$

*Reaction at the electrode of negative polarity*

$$CO + CO_3^{--} \longrightarrow 2CO_2 + 2\ominus \qquad \text{Eq. (2)}$$

*Equation of regeneration*

$$Na_2O + CO_2 \longrightarrow Na_2CO_3 \qquad \text{Eq. (3)}$$

The only difference between this case and Case 1 resides in the nature of the reaction at the negative electrode where the carbon monoxide in an ionized state is oxidized by the carbonate ion resulting in the evolution of carbon dioxide and the liberation of a negative charge at the electrode.

In Case 3 the fuels involved are oxygen and carbon, the electrolyte of sodium carbonate being still retained. The only distinguishing feature in this case over that of Case 1 is in the reaction at the electrode of negative polarity where some form of carbon is used. The principal reactions are as follows:

CASE 3

*Reaction at the electrode of positive polarity*

$$\tfrac{1}{2}O_2 + 2Na^+ \longrightarrow Na_2O + 2\oplus \qquad \text{Eq. (1)}$$

*Reaction at the electrode of negative polarity*

$$C + 2CO_3^{--} \longrightarrow 3CO_2 + 4\ominus \qquad \text{Eq. (2)}$$

*Equation of regeneration*

$$Na_2O + CO_2 \longrightarrow Na_2CO_3 \qquad \text{Eq. (3)}$$

At the electrode of negative polarity the carbon is ionized at the high temperature within the cell with the result that it is oxidized by the carbonate ion forming in consequence thereof carbon dioxide and liberating a negative charge at the electrode.

In the last case oxygen and hydrogen are utilized as the fuels with an aqueous electrolyte of potassium hydroxide. The principal reactions are as follows:

CASE 4

*Reaction at the electrode of positive polarity*

$$\tfrac{1}{2}O_2 + H_2O \longrightarrow 2OH^- + 2\oplus \qquad \text{Eq. (1)}$$

*Reaction at the electrode of negative polarity*

$$H_2 \longrightarrow 2H^+ + 2\ominus \qquad \text{Eq. (2)}$$

*Equation of regeneration*

$$2OH^- + 2H^+ \longrightarrow 2H_2O \qquad \text{Eq. (3)}$$

The electrolyte, irrespective of the detailed chemical reactions involved, gives $H^+$ and $OH^-$ groups. At the electrode of positive polarity the oxygen in an ionized state reacts with the water to form ionized hydroxyl groups. Two of these ionized hydroxyl groups unite with two of the hydrogen ions of the electrolyte as shown by Eq. 3 to regenerate water and in so doing leave the electrode of positive polarity with a positive charge as indicated by Eq. 1. At the electrode of negative polarity the hydrogen, as indicated by Eq. 2 is ionized. These two ionized hydrogen atoms unite with two hydroxyl radicals of the electrolyte likewise forming water and leaving the electrode negatively charged, as noted in Eq. 2. Since water is being formed continuously the concentration of the electrolyte will decrease without limit unless provision is made for removing the excess water. One mode of accomplishing this will be pointed out hereinafter. Thus, as in the cases employing a fused electrolyte the free energy of combustion is converted directly into electrical energy.

From the foregoing typical reactions it should be clear that the fuels at the electrodes of either polarity are electrochemically consumed. That is the fuel at any electrode in an ionized state reacts chemically with a constituent element of the electrolyte leaving the electrode in question with an electrical charge. The words "electrochemically consumed" are employed throughout the specification and claims in the sense defined above.

OPERATING CONDITIONS AS REGARDS PRESSURE AND TEMPERATURE

The rate of electrochemical reaction within the various fuel cells may be accelerated by operating the same at increased pressures and temperatures. It is evident that an increase in pressure of the gaseous fuels employed in the cells will increase their concentration and hence their rate of consumption at the electrodes. The output of the fuel cells is improved by raising the pressure to as high a limit as appears to be practicable although the rate of improvement falls off at pressures above approximately 50 lbs./sq. in. gauge pressure. Gauge pressures of 850 lbs./sq. in. and 1300 lbs./sq. in. have been used with marked improvement in cell performance.

Another method of increasing the rates of electrochemical reaction within the various fuel cells and hence their outputs, is by increasing the temperature of operation. As regards operating temperatures, fuel cells may be divided broadly into two types which are conveniently designated as low temperature cells and high temperature cells. The low temperature cells employ aqueous electrolytes and require the presence of a catalyst for promoting ionization of the fuels; while the high temperature cells generally make use of the fused salt electrolytes and by reason of their elevated temperatures ionization can proceed without any catalyst. The approximate temperature range of the low temperature cells is from 25° C. room temperature to 250° C.; and that of the high temperature cells from 500° C. to 1000° C. It is to be understood, however, that these temperature ranges are approximate only and that we do not desire to be restricted to the precise temperature limits stated, since with improved materials and cell construction, as the art progresses, these limits may be altered.

In our researches conducted with low temperature cells we have determined that the temperature may vary from 25° C. to approximately 75° C. under atmospheric pressure. As the pressure is raised the operating temperature may also be raised. At 50 lb./sq. in. gauge pressure, the optimum temperature becomes about 115° C. Above the temperature of 75° C. at zero gauge pressure or atmospheric pressure, and above the temperature of 115° C. at 50 lb./sq. in. gauge pressure the output of the cell falls off. The upper temperature limit is set primarily by the mounting vapor pressure of the electrolyte. The best temperature of operation at atmospheric pressures in the high temperature cells was from approximately 550° to 850° C., although much higher outputs were obtained with temperatures up to 1000° C. At 850° C. the side reactions in the cell, such as corrosion of the electrodes and cell bodies, proceed at a relatively low rate as compared to that at 950° C., for example, thus explaining the foregoing preferred temperature range. The precise temperature of operation of any particular cell within the aforesaid range will, to some extent, be determined by the nature of the electrolyte and the character of the fuel available for combustion therein.

A SYSTEM IN WHICH THE FUEL CELLS OF THE PRESENT INVENTION MAY BE USED

Turning now to the drawings, there is shown depicted in Fig. 1 thereof a system for the transmission and/or storage of energy in which the fuel cells of our present invention may be advantageously employed. This system constitutes no part of our joint invention but is rather the sole invention of Ross Gunn; and forms the subject matter of an application for U. S. Letters Patent Serial No. 235,290, filed October 15, 1938. This system will be first described so that it may serve as an aid in understanding the operation of our fuel cells; and at the same time illustrate one of the many fields of application thereof.

Broadly stated the system of Fig. 1 contemplates the conversion of electrical energy by electrochemical reaction into chemical potential energy with the attendant formation of gases as the energy carriers. These gases are stored and/or transmitted to the desired point of utilization and the free energy thereof subsequently reconverted by electrochemical reaction into electrical energy. Since the gases may conveniently, but not necessarily, be generated under pressure during the process of energy conversion, it follows that the fluid media serving as the energy carriers may with advantage be stored and/or transmitted under pressure. By means of the foregoing arrangement energy may be transmitted with substantially the same efficiency over any distance whatsoever and without regard to the energy demands placed upon the system. This latter feature is of great importance since it enables the storage of energy when the demand upon the system is below normal for subsequent utilization during periods of abnormal demand.

Before proceeding with a description of the system disclosed in Fig. 1 certain general remarks will first be made concerning the nature of the gases that may be employed therein and the effect of transmitting or storing the evolved gases under pressure. While Fig. 1 indicates by legend that hydrogen and oxygen are to be used in the system as the energy carriers, this is not essential since other gases may be employed that can be generated by electrolytic dissociation and electrochemically consumed in a fuel cell. Hydrogen and chlorine are illustrative but not restrictive of other gases that may be advantageously utilized. When the gases are stored and transmitted under pressure a considerable economy in the materials necessary for the construction of the component parts of the system ensues by reason of the reduction in volume that may be made in the various constituent instrumentalities. Furthermore, the transmission of the gases under pressure to the fuel cell for electrochemical consumption thereat has the effect of increasing the reaction velocity with consequent increase in the energy output of the cell as pointed out previously herein.

Turning now to the drawings, there is shown depicted in Fig. 1 thereof a suitable source of electrical energy identified by the reference character 1, and which for illustrative purposes is disclosed as a direct current electrical generator. The generator suppplies electrical energy to any prior art electrolyzer 2, which by well known methods will dissociate the electrolyte thereof into a plurality of gases such as, for example, hydrogen and oxygen, which are evolved and segregated in separate parts of the cell. The cell or electrolyzer 2 is here shown as of the high pressure type in that the evolved gases are produced at relatively high pressures for subsequent utilization in the system. It is to be understood, however, that the electrolyzer need not be of the high pressure type and that any other prior art cell may alternatively be employed which dissociates the electrolyte into gases at other pressures.

Conduits 3 and 4 under the respective control of the valves 5 and 6 conduct the evolved gases in the manner shown to the fuel cell 7 for electrochemical consumption thereat with attendant reconversion of the chemical potential energy of the gases to electrical energy. The hydrogen and oxygen electrodes of the fuel cell are shown schematically in the drawings and identified respectively by the reference characters 8 and 9. Gas is admitted to these electrodes under the control of valves 10 and 11. While any of the fuel cells known to the prior art may advantageously be employed, the fuel cells forming the subject matter of this joint application are preferred because of the high rates of electrochemical reaction attainable therein. The fuel cell 7 is shown connected to any proper load, such as a motor 12 or an electrical incandescent lamp 13, by means of suitable conductors which are conductively in circuit with the respective electrodes 8 and 9.

Thus, when the valves 5, 6 and 10, 11 respectively at the transmitting and receiving ends of the system are open and the generator 1 is in operation, electrical energy generated by the latter will be converted into chemical potential energy at the electrolyzer with the attendant formation of gases as the energy carriers. The gases so evolved may be transmitted at any desired rate through the conduits 3 and 4 by suitable adjustment of the various valves for electrochemical consumption at the fuel cell 7. Here the chemical potential energy of the gases is reconverted to electrical energy which is supplied to the load all in a manner shown.

If desired the evolved gases may be stored either at the transmitting or receiving ends of the system or at some intermediate point in containers 14 and 15 under the control of their respective valves 16 and 17. Since the gases are transmitted under pressure through the conduits 3 and 4 they may be stored under pressure in the containers 14 and 15. Storage, however, is not restricted to storage in a gaseous state under pressure, since the gases may be liquefied and stored in this condition where it is found expedient. The storage of the above gases in the containers 14 and 15 may take place when energy is being supplied the load and when the demands of the latter on the system are below normal. Thus, the energy stored in the containers 14 and 15 is available for subsequent utilization during periods of abnormal demand. Furthermore, when the fuel cell is not in operation, in the absence of any load, the valves 10 and 11 may be closed and gases supplied to the storage containers 14 and 15 under the control of the valves 5, 6 and 16, 17. The flexibility of the transmission and storage of energy in the foregoing system is thus apparent.

Auxiliary generators or sources of gas supply 18 and 19 may be available along the conduits 3 and 4 or at the respective storage containers 14 and 15, if desired, and as shown, valves 20 and 21 permitting communication between the auxiliary sources of supply and the storage containers. These auxiliary sources of supply are intended to supplement the energy normally furnished the system by the electrolyzer when the demand upon the system is excessive. They may, however, be otherwise employed and many other modes of use will readily occur to those conversant with the problem.

The advantages of a system such as depicted in Fig. 1 are manifold. Thus, the fuel gases may be generated continuously at a more or less uniform rate irrespective of the load demands placed upon the system. The fuel gases which are conveniently, although not necessarily, in a very pure form, may be transmitted normally at high pressure rapidly and through conduits of restricted size to the point of utilization; and the efficiency of transmission is substantially the same regardless of the distances over which the gases are transmitted. Furthermore, there is no limit to the length of the conduits that may be employed. The evolved gases in general will flow through the pipes or conduits constantly and may be stored in containers which have a relatively small volumetric capacity in comparison with the energy that may be stored therein.

THE FUEL CELL IN GENERAL

In Fig. 2 the fuel cell is shown for illustrative purposes as a type which is operable at elevated pressures and/or temperatures. This, however, is not essential, as has been pointed out previously herein. The fuel cell is identified in general by the reference character 7 and includes an hermetically sealed container 22 of adequate strength for resisting any pressure that may be developed therein. Thus, the container may be fabricated of any suitable metal and includes an intermediate portion 23, the ends of which are held in abutting and sealed engagement with closure plates 24 and 25 by any suitable securing means, such as, the bolts 26 and nuts 27.

Within the container 22 there is disposed a vessel 28 which may hold any suitable aqueous, non-aqueous or fused salt electrolyte 29; and which, for illustrative purposes, is here taken as an alkali hydroxide, such as an aqueous solution of potassium hydroxide. A pair of hollow foraminous electrodes 30 immersed in the electrolyte are suitably mounted in the container 22 and are adapted to receive within their respective cavities the gases to be electrochemically consumed. The electrodes are identical in structure and are each closed at the upper end, the lower end being either open or closed as desired. The precise structural characteristics of these electrodes will be set forth herein subsequently. Conductors 31 extend from the electrodes 30 to terminals 32 which are insulated from the metal closure plate 25 by suitable insulating washers 33 and insulating sleeves 34, thus making it possible to take any electrical energy from the fuel cell that may be generated therein during its operation.

The conduits 3 and 4 of the system of Fig. 1 extend through the closure plate 25 and are joined each in a gas-tight manner respectively to conduit sections 35 and 36 in spaced relation therewith by means of insulating sleeves or connectors 37. Since the conduit sections 35 and 36 are curved at their lower ends to extend within the electrode cavities and are electrically insulated from the container 22, there is no possibility of discharging the electrodes to the container walls and hence short-circuiting the cell when it is in operation. The foregoing construction is therefore such that the electrodes 30 will be internally supplied with adequate and proper quantities of gas for electrochemical consumption therein.

Where, as in the embodiment illustrated in Fig. 2, the cell is to operate under pressure, it is clear that a differential pressure must always be maintained between the gas within the electrode cavity and the gas in the space above the surface of the electrolyte. This difference in gas pressure is approximately equal to the hydrostatic head extending from the surface of the electrolyte to the level of the electrolyte within the electrode cavity. Where the electrode is completely filled with gas this differential pressure is, of course, equal to the hydrostatic head corresponding to the depth of immersion of the bottom of the electrode. This difference in gas pressure may be achieved in any of several ways but is perhaps most easily accomplished by forcing the gas in at the bottom of the electrode and simply allowing it to fill completely.

The fuel cell 7 is arranged in a heat insulating casing or jacket 38 wherein there is disposed any suitable heating device, such as an electric resistance unit 39 adapted to be heated by the passage of current therethrough, for maintaining the electrolyte 29 within the container at the desired operating temperature. This heating unit not only will keep the aqueous electrolyte at the proper temperature, when this is desired, but will also maintain a fused salt electrolyte at any desired operating temperature when such an electrolyte is employed. In large installations where energy is constantly being dissipated in the fuel cell such an extraneous source of heat is unnecessary after the cell is in actual operation, any surplus heat under these circumstances being carried off by any of the well-known expedients available in the prior art.

The electrochemical reactions involved in the conversion of the free energy of combustion of the fuels into electrical energy have already been stated at length. Where the fuel employed is hydrogen and the electrolyte is an alkali hydroxide, such as potassium hydroxide, as in the embodiment here under discussion, it was noted in Case 4 under the caption "Typical electrochemical reactions," that water was continuously generated in the cell. In order to prevent the concentration of the electrolyte from decreasing without limit a small heat-exchange unit identified in general by the reference character 40 is associated with the cell for condensing and removing any excess water vapor produced in the cell. This unit includes a condensing coil 41 connected at its upper end by conduit 42 with the casing interior of the cell 7 and at its lower end with a sump 43 under the control of a valve 44. The coil is disposed within a casing 45 and is surrounded by a heat-exchange medium, as shown, which is introduced into the casing by the conduit 46 controlled by the valve 47 and is discharged therefrom by a conduit 48 under the control of a valve 49. The valve 44 is normally retained in a closed position so that the gas pressure within the cell may not be disturbed. As new water is formed in the fuel cell by electrochemical action, the heat exchange or cooling medium within the casing 45 may be circulated and any surplus water condensed within the coil 41. By opening of the valve 44 this water may be drained into the sump 43. In this manner the concentration of the electrolyte in the fuel cell may be readily maintained.

THE SURFACE TENSION ELECTRODE STRUCTURE IN GENERAL

In order to achieve practicable rates of electrochemical reaction within the fuel cell, we employ what may be conveniently designated as a surface tension electrode to obtain mutuality of contact between the electrode, electrolyte and gas over large areas. The electrode is electrically conductive and foraminous in character having the electrolyte disposed exteriorly of the gas cavity thereof which wets the same with the attendant formation of a thin film of electrolyte at the electrode surface. Gas is arranged interiorly of the electrode for cooperation therewith and with the electrolyte. The gas under proper and normal operating conditions cannot escape from the electrode interior, since its pressure under normal circumstances is only sufficient to force the electrolyte wholly or partially out of the electrode cavity which would otherwise be filled by the same. At the foramina of the electrode there is formed a gas-electrolyte interface which is preserved and maintained in equilibrium by the forces of surface tension acting at the electrode. A substantial part of the gas-electrolyte interface at each foramen of the electrode is separated from the electrode surface by the aforesaid thin film of electrolyte which extends over substantial areas thereof and through which adjacent gas may readily diffuse to the electrode electrolyte interface to insure the aforesaid mutuality of contact thereat. In the prior art fuel cells, any mutuality of contact between the electrode, electrolyte and gas has been only a line contact with the result that the rates of electrochemical reaction have been exceedingly small and hence decidedly impractical. In accordance with the present invention, however, the mutuality of contact is an area contact over substantial areas at each foramen of the electrode. Since the electrode is provided with a multiplicity of foramina, the total electrode surface covered by the electrolytic film is exceedingly large resulting in mutuality of contact between the electrode, the electrolyte and gas over extended areas and the achievement of practicable rates of electrochemical reaction.

In general the surface-tension electrode must be foraminous in character and electrically conductive at least in part. Such a pertused or porous electrode structure can, of course, be fabricated in any of a number of ways, many of which will immediately suggest themselves to those skilled in the art in the light of the teachings embodied in our specification. We have, however, in accordance with our invention devised a reticulated foraminous electrode and a sintered foraminous electrode both of the surface tension type, which we believe to be wholly novel and which will now be described.

THE RETICULATED FORAMINOUS ELECTRODE

In Fig. 3 of the drawings there is delineated in sectional elevation on an enlarged scale the reticulated electrode structure employed in the cell of Fig. 2 showing the progressive increase in distortion of the gas-electrolyte interface caused by the progressively increasing pressure differential along the electrode surface. Both electrodes in the cell of Fig. 2 are identical in structure, the one shown in Fig. 3 being for purpose of exposition the electrode which is supplied by gas through the conduit 4. The reticulated electrode is electrically conductive in character and may be fabricated in any convenient manner from any suitable metal, alloy, highly conductive oxide or conductive oxide mixtures. Nickel, iron, copper, nickel-chromium, steel, copper oxide and magnetite are illustrative materials that may be used. The openings or foramina in the mesh structure may have any desired configuration and are here shown by way of illustration as being square in shape. The precise geometric form of the opening, however, is of no moment; but its size is. For the smaller the size of the opening the greater may be the electrode height without disruption of the gas electrolyte interface preserved by surface tension.

The gas is conducted into the cavity of the screen electrode by the conduit section 36 to displace the electrolyte therein. The gas pressure within the electrode cavity is, of course, uniform and equal to the pressure exerted by the electrolyte at the gas-electrolyte boundary 50 wherever this boundary may be. This surface or boundary 50 will assume varying positions depending upon whether the electrode is partially or completely filled with gas. Whether or not the electrode is partially or completely filled with gas, however, is dependent upon the operating conditions, namely, the rate of electrochemical consumption of the fuel gas at the electrode electrolyte interface and the rate and pressure at which the gas is supplied. In the instant case it is assumed that the operating conditions are such that the electrode is completely filled with gas. Hence the electrode is shown as completely filled with gas so that the gas-electrolyte boundary 50 is substantially at the electrode bottom.

As shown in Fig. 4 of the drawings the electrolyte wets the metal mesh completely and the inside of the electrode at the surface of the conductors 51 is therefore covered with thin films of electrolyte 52 at each of the foramina thereof. These films cover substantial areas of the conductors 51 constituting the electrode structure, as is evident from an inspection of Figs. 3 and 4; and thus adjacent gas can readily diffuse therethrough to the electrode-electrolyte interface 53 with the assurance that there will be mutuality of contact thereat between the gas, electrode and electrolyte over substantial areas. As each of the electrode foramina there is formed a gas-electrolyte interface 54 which has an area of extent indicated by the dimensional arrows. This gas-electrolyte interface is maintained and preserved in equilibrium by the forces of surface tension acting at the electrode conductors 51. The preservation of this gas-electrolyte interface by the forces of surface tension insures the maintenance of the thin films of electrolyte 52 through which the gas diffuses for electrochemical reaction at the electrode-electrolyte interface 53. The angle between the metallic surface and the free liquid surface is indicated in Fig. 4 by the symbol $\theta$ and is termed the interphase angle. A fact of paramount importance is that the gas cannot and does not escape from the electrode interior under proper and normal operating conditions; and that it is electrochemically consumed substantially solely at the electrode-electrolyte interface where mutuality of contact between the electrode, electrolyte and gas obtains over extended areas. Thus practicable rates of electrochemical reaction are at all times insured.

Referring again to Fig. 3 it will be observed that all of the electrode mesh at the top and sides is exposed to the gas through the thin films of electrolyte 52 at the various foramina. This is, of course, a desirable condition since all electrode surfaces are being utilized. Now, if the electrode is too long or high in extent the differential pressure at certain parts of the electrode may be excessive and sufficiently great to overcome the stabilizing force of the surface tension, with the result that some of the gas will escape from the electrode cavity and the electrode will become partially filled with electrolyte. While the electrode will not be rendered inoperative by this occurrence, this condition is nevertheless economically undesirable since all of the electrode surface is not being utilized in the processes of energy conversion and some of the gas is wasted. Hence, it becomes necessary to determine the maximum height of the electrode at which the forces of surface tension are capable of preserving the gas-electrolyte interface 54 at all foramina.

Since the gas pressure within the electrode cavity is uniform and equal to the pressure exerted by the hydrostatic head H in view of the assumption made with reference to the gas electrolyte boundary 50, it follows that there is a pressure difference at the gas-electrolyte interface 54 of the electrode which is exerted outwardly and which progressively increases from the bottom of the electrode upwardly. That this is true becomes immediately apparent when it is considered that the liquid electrolyte exerts a pressure of $[H-h]$ at the foramina at the top of the electrode. Hence, the pressure difference at the top of the electrode acting on each gas electrolyte interface is $H$ (due to the gas) $-[H-h]$ (due to the liquid electrolyte) or simply $h$. At the bottom of the electrode the pressure difference acting at each gas electrolyte interface is $H-H$ or zero. It should, therefore, be clear that the pressure difference on the gas electrolyte interface progressively increases from the bottom of the electrode upwardly, namely, from zero to $h$. Thus, a progressively increasing distortion of the gas-electrolyte interface ensues as shown clearly in Fig. 3 of the drawings. This pressure difference is greatest at the top of the electrode and is there equal to the pressure exerted by the hydrostatic head $h$ of the electrolyte, where $h$ is the maximum height of the electrode as shown in the drawings. This pressure difference is therefore $hdg$ where $d$ is the density of the electrolyte and $g$ is the acceleration due to gravity. Hence, if $A_m$ represents the mean area of the individual openings in the screen the force acting at any single foramen or opening will be $$F = A_m . h d g \qquad \text{Eq. 1}$$

This force acts outwardly of the screen opening and is opposed by a contrary or stabilizing force of surface tension acting at the periphery of the opening. If $S_m$ designates the mean periphery of the individual openings then the stabilizilng force will be $$F = S_m . T \cos \theta \qquad \text{Eq. 2}$$

where T is the surface tension of the electrolyte and $\theta$ is the angle between the metal surface and the free liquid surface at the effective point of contact and is termed the interphase angle. If the gas electrolyte interface 54 at the electrode top is to be preserved and maintained in equilibrium by surface tension the forces F are then equal and Eqs. 1 and 2 must be equated in order that the maximum height of the electrode under these circumstances may be determined. By equating and solving for the electrode height the following equation is obtained:

$$h = \frac{S_m}{A_m} . \frac{T \cos \theta}{d g} \qquad \text{Eq. 3}$$

Thus, the maximum electrode height cannot exceed the value given by Eq. 3 if the gas electrolyte interface 54 at all foramina is to be preserved in equilibrium by surface tension.

For the case where the electrode foramina have the configuration of a square, Eq. 3 reduces to $$h = \frac{4}{s_m} . \frac{T \cos \theta}{d g} \qquad \text{Eq. 4}$$

where $s_m$ is the mean dimension of one side of the square. In the event the openings are of circular contour Eq. 3 becomes $$h = \frac{2}{r_m} \cdot \frac{T \cos \theta}{dg} \qquad \text{Eq. 5}$$

where $r_m$ is the mean radius of the individual openings. Other things being equal, it is at once evident from a consideration of Eqs. 4 and 5 that the maximum height of the electrode may be increased by reducing the size of the openings or foramina of the electrode; and this holds irrespective of the configuration of the openings. Of course, there are limits to the fineness of the mesh that may be employed in a reticulated electrode by reason of the low conductance attained, resulting in an electrode of inordinately high resistance. In some of the cells that we have constructed mesh electrodes having a height of 15 cm. have been employed. In large cells the electrodes may be fashioned in compartments where the maximum height of each compartment is that computed by the foregoing equations, or the electrodes may be disposed horizontally in which case there is no limit to the size of the electrode, though the height must be limited as before and for the same reason.

By the use of electrically conductive members 55 spot welded or otherwise secured to the sides of the mesh or screen electrode its rigidity and mechanical strength may be increased and the electrical resistance thereof simultaneously reduced.

THE SINTERED FORAMINOUS ELECTRODE

The electrodes 30 in the cell of Fig. 2 may alternatively be of the sintered type. It is to be emphasized at the very outset that the sintered foraminous electrode is identical in principle and operation with the reticulated foraminous electrode previously described. Hence, everything that has been said concerning the reticulated electrode and particularly those remarks with regard to surface tension and electrode height, apply with full force and effect to the sintered foraminous electrode.

The initial step in the fabrication of the sintered foraminous electrode is delineated in Fig. 5 of the drawings. In this figure a relatively coarse screen 56 fabricated in any suitable manner and of any convenient metal, such as nickel, or any other electrically conductive material, serves as a mechanical and electrical base. On this foraminous reticulated electrically conductive base number 56 there are spread metalliferous particles 57, preferably of a uniform and selected size as shown, to form a layer for subsequent sintering. These particles may be of nickel or nickel oxide, or any other suitable metal, metallic oxide or mixtures thereof. The base member 56 with its layer of fine or granular particles covering and arranged over the same is placed in a furnace under reducing conditions and brought to a temperature just below the melting point of the several materials. If metallic oxide particles are employed they may or may not be reduced to the metallic form, but the fine or granular material will be sintered forming a homogeneous coherent but very porous electrically conductive mass, electrically bonded to the base or screen member. The electrode thus formed is equivalent to a very fine screen electrode. Because the openings of such a screen electrode are small, this improved electrode structure is well adapted for use in electrode elements of considerable dimensions and may be operated under appreciable pressure, if desired. Furthermore, the sintered construction yields an electrode not so easily corroded and of superior mechanical and electrical characteristics. A fragmentary cross sectional view of the completed sintered foraminous electrode is shown in Fig. 6 as it would be used in the fuel cell of Fig. 2, for example. The porous sintered mass 58 and the base member 56 electrically bonded thereto are shown operatively disposed with respect to the electrolyte 59. The electrolyte, which may be either of an aqueous, non-aqueous or fused salt type, is immediately adjacent the sintered mass 58.

That the sintered porous electrode structure by virtue of the forces of surface tension is capable of preserving the gas electrolyte interface at the electrode foramina and hence functions in a manner identical with the screen electrode previously described herein, will become more apparent upon reference to Fig. 7. This figure is a fragmentary cross sectional view on an enlarged scale of the sintered porous electrode of Fig. 6 showing a gas-electrolyte interface 60 at one of the foramina thereof; and the thin film of electrolyte 61 at the electrode surface through which adjacent gas diffuses to the electrode-electrolyte interface 62. Again it should be noted that the thin film of electrolyte 61 covers substantial areas of the electrode surface thus insuring the diffusion of gas therethrough for mutuality of contact over the requisite surfaces at the electrode-electrolyte interface. The gas-electrolyte interface 60, of an extent indicated by the dimensional arrows, is maintained in equilibrium by surface tension. The angle between the metallic surface and the free liquid surface is indicated by the symbol $\theta$ and is termed the interphase angle. Again we wish to stress the fact that gas cannot and does not escape from the electrode interior under proper and normal operating conditions; and that it is electrochemically consumed substantially solely at the electrode-electrolyte interface where mutuality of contact between the electrode, electrolyte and gas obtains over extended areas. Thus practicable rates of electrochemical reaction are at all times insured and the gas is economically employed.

For best results the thickness of the sintered mass in relation to its porosity must not be too great. It is essential that the gas within the electrode be able to pass through the porous mass to the regions adjacent the electrolytic film 61 for diffusion therethrough at a rate more than the rate of consumption at the electrode electrolyte interface 62.

CATALYSTS

No catalytic stimulation is required in the high temperature cells where all ionization processes proceed with adequate speed. In the low temperature fuel cells, however, catalytic action must take place at the electrode surfaces for promoting gaseous ionization thereat. While the electrode metals, such as nickel, copper and iron, for example, are catalytically active at the higher temperatures in these cells, their catalytic activity may be measurably enhanced in the case of aqueous solutions at the lower temperatures by applying a coating of a metal or metals of the class of noble metal catalysts to the electrically conducting surfaces thereof. In this group of noble metal catalysts are such metals as platinum, palladium, rhodium and iridium. The black forms of these metals expose more surface to the gas and hence are more active catalytically. The catalyst may be applied to the electrode surface by corroding the conducting surface with acid or other means and depositing on this roughened surface, through electrolysis or otherwise, the catalytic coating. The corroding process, although not necessary, assists in mechanically supporting the catalyst on the electrode.

Fig. 8 is a view in cross section of one of the conductors of the foraminous reticulated electrode provided with a catalytic coating. The conductor is identified by the reference character 51 to the surface of which there is applied a layer 600 of any one of the noble metal catalysts such as platinum, platinum black or palladium black. This layer may be applied by electrolysis, if desired. Further improvement in performance is observed if this layer is further covered by a layer of carbon black 610 applied in any suitable manner and with a final layer 620 of palladium black disposed over the carbon layer. Where the carbon and palladium black are applied in separate layers there is an intermixing of the carbon and palladium black at their common boundary. The carbon apparently has the sole function of supporting the palladium black. Alternatively the carbon and palladium black may first be intimately mixed and the mixture so formed applied to the electrode structure. This latter arrangement is perhaps more economical since but little palladium black need be employed to obtain the proper catalytic action. In Fig. 9 the sintered foraminous electrode is shown as provided at its surface with a layer 630 of platinum or palladium black, by way of example. When so coated this electrode is adapted for use in the low temperature cells where aqueous electrolytes are employed.

METHOD OF ENERGY CONVERSION

From what has been said hereinbefore it should be clear that we have devised a novel method of energy conversion which, although described in connection with the fuel cells of our invention, nevertheless, has general application in the field of electrochemistry where the free energy of reaction of a gas is to be converted directly into electrical energy. This method essentially comprises diffusing the gas through a thin film of electrolyte to an electrically conductive surface where by virtue of mutuality of contact over requisite areas between the conductor, gas and electrolyte high rates of electrochemical reaction ensue. Where the film of electrolyte and the electrically conductive surface are of extended area, the rate of electrochemical reaction at the conductor electrolyte interface is proportionately increased. The rate of electrochemical reaction may be further enhanced by supplying the gas under pressure for diffusion through the electrolytic film.

THE FORAMINOUS VENTED ELECTRODE

Where a gas is employed in the cell at either or both of the electrodes of opposing polarity in which one or more of the components thereof cannot be electrochemically consumed, it is essential that provision be made for rejecting or venting the unconsumed component since otherwise the concentration thereof will increase until further reaction is inhibited. Thus, where air is used at one of the electrodes, for example, the nitrogen and other constituent parts thereof that will not enter into the electrochemical reaction at the electrode surface must be purged.

An electrode structure for accomplishing the foregoing is depicted in Fig. 10 of the drawings wherein a foraminous electrically conductive electrode of the surface tension type, identified in general by the reference character 64, is shown shaped as a parallelopiped and closed both at the top and bottom to avoid any possible escape of the gas from the electrode interior into the electrolyte 65 by spilling over at the bottom. The electrolyte may, of course, be of an aqueous, nonaqueous or fused salt type. The configuration of the electrode as a whole is of no importance; and hence geometrical constructions other than parallelepipeds may be employed. Apertures 66 suitably spaced along the length of the electrode and adjacent the bottom thereof are provided for rapidly discharging the electrolyte from the electrode cavity which is displaced by the gas introduced therein, but are not necessary since the electrolyte will escape through the pores of the foraminous electrode. The foraminous portions of the electrode structure and which are of the surface tension type, may be constructed in any suitable manner; but are preferably of either a foraminous reticulated construction or a foraminous sintered construction, all as described hereinbefore. Baffles 67 are disposed within the electrode cavity in the manner shown for causing the gas to traverse a circuitous or tortuous path to thereby insure a complete circulation of the gas and an effective electrochemical consumption thereof so far as possible. These baffles are conveniently fabricated of any suitable electrically conductive material and are spot-welded or otherwise conductively secured to the foraminous sides and ends of the electrode in the manner shown. Thus the baffles not only improve the general rigidity of the electrode structure and make the same more durable, but also increase the electrical conductivity thereof. Conduit section 68 serves to introduce the gas into the electrode interior while the conduit section 69 vents any unconsumed portion of the gas.

In operation the gas enters the foraminous electrode through the conduit section 68 and bubbles up into the electrode section formed by the first baffle, the electrolyte being rapidly discharged from the electrode interior through the adjacent aperture 66. Every section within the electrode will shortly thereafter be filled with gas. If the gas is completely consumed no venting action will take place at the conduit section 69. If, on the other hand, one or more of the gaseous components are not consumed they will be continuously purged or vented at the conduit section 69 with the result that the electrochemical reactions within the cell are in no wise inhibited. The electrode of Fig. 10 is therefore ideally adapted for use under those circumstances where gas is to be continuously supplied to a fuel cell.

THE FUEL CELL OF LOW INTERNAL RESISTANCE

In Figs. 11 to 15 of the drawings there is depicted a fuel cell of low internal resistance. In this cell there are disposed intermediate the end electrodes of opposing polarity, a plurality of electrodes that are in electrical communication solely within the cell. Any coupled pair of intermediate electrodes may optionally be removed from the cell, if desired, without destroying the operativeness thereof as will be pointed out more in detail hereinafter. Figs. 11 and 12 are fragmentary cross sectional elevations taken longitudinally of the fuel cell and showing the respective end portions thereof of opposing polarity. Fig. 13 is likewise a fragmentary longitudinal cross sectional elevation of the cell but is taken at the medial portion thereof showing a modified intermediate electrode structure. Fig. 14 is a transverse section of the fuel cell taken on the line 14—14 of Fig. 11. That portion of the fuel cell depicted in Figs. 11, 12, 14 and 15 of the drawings will be first described before proceeding to the description of the modified electrode structure of Fig. 13.

The casing 70 of the fuel cell is fabricated of any suitable material, such as a ceramic material, for example, and has disposed therein an aqueous, non-aqueous or fused salt electrolyte 71. The two end electrodes of opposing polarity are identified in general by the reference character 72; and the intermediate electrode pairs by the reference character 73. All electrodes as shown in the drawings are well immersed in the electrolyte 71.

Each of the intermediate electrode pairs 73, as shown more particularly in Figs. 11, 14 and 15, includes a common supporting member 74 fashioned as an imperforate plate and extending transversely of the casing. This plate is electrically conductive in character and is fabricated preferably from any suitable metal or metallic oxide or metallic oxide mixture. Nickel, since it is readily available, is quite satisfactory for this purpose. From each side of this common supporting member or plate 74 there extends in spaced relation a plurality of horizontally arranged imperforate electrically conductive elements 75 which at their ends are in abutting engagement with like but vertically arranged imperforate electrically conductive elements 76. These elements may all be fashioned from the same material as is the plate and may be cast integral therewith or be conductively secured thereto as discrete parts to form a unitary structure of high electrical conductivity. Foraminous electrically conductive facings or closures 77 of the surface tension type are conductively secured to the said elements 75 and 76 on both sides of the common supporting plate 74 and form with the said elements and plate separate and isolated compartments 78 for the reception of a gas. These foraminous facings or closures 77, which as has been stated are of the surface tension type, may be constructed in any suitable manner but are preferably of either a foraminous reticulated construction or a foraminous sintered construction, all as described hereinbefore.

Baffles 79 are disposed within each of the electrode compartments 78 on both sides of the common supporting member in the manner shown forming communicating sections therein for causing the gas to traverse a circuitous or tortuous path to thereby insure a complete circulation of the gas and an effective electrochemical consumption thereof so far as possible. These baffles are fashioned of any suitable electrically conductive material and are spot-welded or otherwise conductively secured to the facing 77, common supporting member 74 and conductive elements 75 as shown in Fig. 12. Thus the baffles not only improve the general rigidity of the electrode structure and make the same more durable, but also increase the electrical conductivity thereof. Each compartment 78 adjacent the bottom and along its length may be provided at the facing or closure 77 with apertures 80 for facilitating the discharge of the electrolyte from the electrode cavity that is displaced by the gas introduced therein. Ceramic or other protective inserts 81 are provided and positioned along the peripheral portions of the composite electrode structure as shown for preventing any destructive, corrosive or local action by the electrolyte at the surfaces of the end and side elements 75, 76 and at the marginal surfaces of the supporting plate 74, which in the absence of such protection would occur. The two electrodes of any unitary intermediate pair 73 are in the operation of the cell of opposing polarity; and since the composite structure is of high electrical conductivity these two electrodes are in low resistance electrical communication solely within the cell.

The end electrodes 72 of opposing polarity are arranged for cooperation with the intermediate electrode pairs in the manner shown in Figs. 11 and 12; and are in every respect identical in construction with these latter electrodes except that the electrode structure on one face of the common supporting plate 74 has been omitted. Each of these end electrodes 72 has suitable terminals, identified in general by the reference character 82, removably associated therewith by means of which electrical energy is taken from the cell. Such terminals may, for example, comprise shanks 83 threaded at their respective ends, one end being in threaded and removable engagement with the supporting plate 74 and the other end being provided with a washer 84 and wing nut 85.

Except for the fact that the common supporting plate of the intermediate electrode pair of Fig. 13 is of a suitable insulating material, such as a ceramic material, for example, this electrode pair in all other respects is identical with the intermediate electrode pairs depicted in Figs. 11, 12, 14 and 15. Corresponding parts in Fig. 13 are, therefore, identified with primed numerals. Since, however, the common supporting member 74' is of insulating material, electrical conductors 86 extending through the supporting plate must be employed and placed sufficiently close together to provide low resistance electrical connection between the electrically conductive foraminous closures or facings 77'.

The compartment height of each of the electrodes depicted in Figs. 11 to 15 is preferably not in excess of the value given by Eq. 3 on page 8 of this specification so as to insure the preservation of the gas-electrolyte interface at all foramina of the facings or closures all in a manner pointed out in detail hereinbefore.

In order that the electrodes of the low resistance cell may be removed when desired the casing 70, by way of example, is interiorly provided with a series of parallelly spaced continuous grooves 87. Each groove consists of two channel portions formed in the opposing inner side walls of the casing, which at their lower ends are continuous with and merge into a bottom channel portion, as clearly shown in Figs. 11 to 15. The electrodes are thus all mounted in proper relation with respect to each other by being positioned in the individual grooves provided therefor. Each groove of the casing engages the peripheral portions of the electrode supported therein and permits the removal of the electrode from the cell when this becomes necessary or is deemed expedient. When the end electrodes 72 are to be removed the terminals 82 must, of course, be first detached. No preliminary operation is required in this connection as regards any of the intermediate electrode pairs 73 and 73'. It is an important feature of our invention that any intermediate electrode pair may be removed from the fuel cell without destroying its operativeness. This is highly advantageous when it becomes necessary for any reason to replace or repair an electrode of the cell without interruption of the energy supplied to the load.

Two main conduits 88 and 89 are arranged longitudinally of the fuel cell, as shown more particularly in Figs. 11, 12, and 13. One of these conduits, for example conduit 88, supplies gas that will cause one group of electrodes to develop a positive polarity, as shown; and the other conduit 89 will then furnish a gas that will cause the remaining group of electrodes to develop a negative polarity, all as depicted diagrammatically in Figs. 11, 12 and 13 of the drawings. Auxiliary conduits 90 and 91 are supplied from the main conduits 88 and 89 respectively for furnishing alternate positive and negative electrodes with the necessary gases. Each of the auxiliary conduits 90 and 91 is detachably secured to its respective main conduit by a connector 92 so that its connection with the main conduit may be severed preparatory to removing one or more of the electrodes from the cell. The main and auxiliary conduits, if of metal or of other electrically conducting material, are of course electrically insulated from each other in any suitable manner. This may be conveniently accomplished by making each connector 92 insulating in character so that each auxiliary conduit is not only detachably secured to its main conduit but is electrically insulated therefrom. In the event of removal and consequent detachment of the auxiliary conduits 90 and 91 a valve 93 disposed at each of the main conduits 88 and 89 may be closed for preventing any wastage of the gas. The auxiliary conduits 90 and 91 extend downwardly within the casing of the fuel cell and preferably, although not necessarily, downwardly within and through the several electrode compartments 78 for protecting the conduits against any corrosive action of the electrolyte. As shown clearly in Figs. 11 and 14, each auxiliary conduit is positioned at one side of a composite electrode and has a valve 94 in communication therewith in each compartment 78 adjacent the lower end thereof. This valve serves to automatically supply the compartment with gas and may be any type of valve known to the prior art the opening and closing of which is controlled by liquid level.

As illustrating one type of valve that may be employed, we have disclosed in Fig. 16 a slotted housing 95 having a valve seat 96. A spherical member 97 of proper density is arranged for co-operation with the valve seat 96. The arrangement is such that the sphere will float in the presence of electrolyte, thus permitting the supply of gas to the electrode compartment; but will engage the valve seat 96 and close off the supply of incoming gas when the compartment is filled with gas and the electrolyte has been displaced from the region about the sphere. By the utilization of a valve of the foregoing general character each compartment of the composite electrode will at all times be automatically supplied with an adequate quantity of gas; and the rate of supply will of itself be adjusted to the rate of electrochemical consumption at the electrode surface without any needless wastage of consumable gas components which would otherwise be vented through the conduits 88 at the other extreme side of the composite electrode, as shown more particularly in Figs. 14 and 15.

In operation gas enters each of the compartments 78, 78' of the several electrodes adjacent the valve 94 thereof and bubbles up into the first section formed by the baffle. At the same time electrolyte is being discharged from the electrode interior through the screen or through the apertures 80. Every section of each electrode compartment will shortly thereafter be filled with gas. If the gas is completely consumed and is supplied at a proper rate no venting action will take place through any of the conduits 88. If, on the other hand, one or more of the gas components are not consumed, they will be continuously purged or vented through the aforesaid conduits with the result that the electrochemical reactions within the cell are not inhibited. Electrical energy is delivered by the cell only at its terminals 82 and is not taken from the cell at any intermediate electrode pair. At any electrode pair 73, 73' the current passes directly from one electrode to the other by virtue of the low resistance coupling therebetween solely within the cell. Thus, we have provided a durable and highly practicable fuel cell of low internal resistance. In any installation fuel cells each incorporating, for example, 125 electrode units may be conveniently employed. Such a cell will have an extremely low internal resistance and will supply about 100 volts at normal full load. It is estimated that the power output from such a cell per cubic meter will approximate 15 kilowatts.

THE PROBLEM OF DEPOLARIZATION

Our researches show that in those cells wherein oxygen is employed, serious polarization occurs at the oxygen electrode when a fused salt electrolyte is present. This polarization, insofar as we are aware, is due to the progressive formation of metallic oxides in regions adjacent the oxygen electrode which have the effect of ultimately impairing and inhibiting the electrochemical reactions which normally occur thereat. In consequence thereof, after the lapse of some time, the output of the cell is reduced. We have discovered that depolarization at the oxygen electrode can be successfully achieved if moderate amounts of carbon dioxide, however obtained, are supplied the electrode in question along with the oxidizing gas. This has the highly desirable effect of converting the oxides contiguous to the electrode into carbonates, thus effectively eliminating the polarization thereat.

If the electrolyte within the cell is one that dissociates into carbonate anions or one of the electrodes is carbonaceous in character, carbon dioxide will in either event be generated at the electrode of negative polarity as pointed out in cases 1, 2 and 3 under the caption "Typical electrochemical reactions." By far the greater portion of the carbon dioxide evolved at this electrode escapes from the fuel cell, and hence depolarization at the oxygen electrode will not automatically ensue. The carbon dioxide generated under these circumstances may, however, be retrieved and can conveniently, but not necessarily, be utilized as the depolarizing gas.

The volume ratio of carbon dioxide to oxygen supplied at the oxygen electrode may, of course, vary over a wide range; but a typical useful ratio is a ratio of 1 to 2. By using carbon dioxide as a depolarizer in the high temperature cells, for example, we have attained outputs of about 50 milliamperes per square centimeter of electrode surface and voltages of about 0.85 volt per electrode pair.

THE FUEL CELL WHEREIN A FORMED CARBONACEOUS ELECTRODE IS EMPLOYED

Organic or carbonaceous fuels are particularly well suited for use in the cells of our invention. In order, however, to promote the necessary ionization of the carbon within the cell to insure suitable rates of electrochemical reaction, it has been found necessary to operate the cell as a high temperature cell with a fused electrolyte.

The fuel cell depicted in Fig. 17 is of the type wherein a formed carbonaceous electrode is employed as the electrode of negative polarity. The carbonaceous electrode portions 99 may be fabricated in any suitable manner and may be conveniently of porous carbon formed by many well know methods from coal, coke or petroleum residues. These carbonaceous electrode portions may or may not be mounted on an electrically conductive supporting plate or member; and are constantly consumed by electrochemical reaction necessitating their replacement from time to time. The electrolyte 100 is taken by way of illustration as the fused salt mixture VIII of the table appearing on page 3, the principal electrochemical reactions within the fuel cell being in consequence thereof those of case 3, page 4, under the caption "Typical electrochemical reactions." The cell will, therefore, generate carbon dioxide at the negative electrode that will escape without accomplishing any useful purpose unless it be retrieved, at least in part, to be used as a depolarizer. The carbonaceous electrode portions 99 must in every instance be in contact with a conductor, so that the negative charge which is liberated at the electrode may be carried off. The cell construction of Fig. 17, except for the use of formed carbonaceous electrodes 99 and the provision of a closure member 101 for preventing the escape of the evolved carbon dioxide, is identical in all respects with the cell construction depicted in Figs. 11, 12, 14 and 15 and described under the caption "The fuel cell of low internal resistance." Hence, like reference characters have been employed to designate corresponding parts.

Oxygen may be supplied from a source 102 under control of the valve 103, or air alternatively supplied by the conduit 104 controlled by the valve 105. The oxidizing gas is forced into the various compartments 78 of the foraminous surface tension electrode structures by means of a pump 106, if desired, driven by a suitable prime mover 107. In order to depolarize the oxygen electrode, carbon dioxide may be simultaneously supplied from a separate source 108 under the control of valve 109, or may be reclaimed in part from the closed cell itself through the conduit 110 and valved at 111 for proper admixture with either the oxygen or air. Valve 200 which opens into the atmosphere provides a means of purging the closed cell of an excess of carbon dioxide or other gases. Thus, by appropriate settings of the various valves a proper carbon dioxide oxygen mixture may be supplied to the electrodes of positive polarity for consumption thereat without the deleterious effects of polarization which would otherwise be ultimately encountered. Unconsumed particles and ashes, if any, resulting from the electrochemical combustions come to the surface of the electrolyte and are floated off into a waste pipe or settle to the bottom of the cell and are occasionally cleaned out by suitable means.

APPARATUS FOR SUPPLYING A FUEL CELL WITH CRACKED FUEL

In the embodiment of our invention depicted in Fig. 18 where the organic or carbonaceous fuel is capable of being decomposed by heat to yield at least one of the end products of the group consisting of carbon, hydrogen and carbon monoxide, we have resorted to the wholly novel expedient of decomposing the fuels either exteriorly or interiorly of the fuel cell and of supplying one or more electrodes thereof with at least one of the aforesaid end products for electrochemical consumption thereat. The organic fuels that may be used in the decomposing process may be either in a solid, liquid or gaseous form and either in a prepared, semi-prepared or natural state. The only essential requirement, as stated, is that the fuel be susceptible of being decomposed by heat to yield at least one of the end products of the group consisting of carbon, hydrogen, and carbon monoxide. That these products can be efficiently consumed in a fuel cell has been demonstrated in the various cases discussed under the caption "Typical electrochemical reactions."

Many organic fuels having the essential characteristics of the preceding paragraph are known to the prior art and all such fuels we accordingly include in this specification. As exemplifying some of the fuels that may be employed, reference is made to the broad class of petroleums, the many products and derivatives thereof; the broad class of hydrocarbons and the oxygenated derivatives thereof, such as, the alcohols; and well known other sources of carbonaceous materials, such as, coal and the derivatives thereof. More specifically among the gaseous forms of fuels there may be mentioned, by way of example, illuminating gas, natural gas, methane, ethane, propane, butane, iso-butane; and among the liquids, pentane to hexadecane, the various oils, methyl and ethyl alcohol.

A decomposing process is, of course, subject to the law of mass action. Therefore, since the end products of the decomposing process, namely, one or more of the group consisting of carbon, hydrogen and carbon monoxide, are removed from within the cell electrode as they are formed, it being assumed that the decomposing is carried on within the cell, it follows that a lower temperature can be employed to secure complete decomposing than in some processes which do not remove the end products of the decomposing process as they are formed. It is a fact that very few compounds can be cracked at temperatures below 600° C.; and that, hence, the low temperature fuel cell cannot be employed when decomposing is to be carried on interiorly thereof. On the other hand, the high temperature cells cannot be economically operated at temperatures above 1000° C. as the cell is envisioned, since the side reactions in the cell at this temperature proceed at a rapid rate with the constructional materials now available all as has been pointed out hereinbefore under the caption "Operating conditions as regards pressure and temperature." Hence the preferred operating range when decomposing fuels within the cell may be said to extend from 700° to 850° C., it being understood that temperatures up to 1000° C. and beyond this may be employed but that they are not now deemed economically feasible. Thus, fused salt electrolytes must be used when decomposing interiorly of the cell to provide the requisite decomposing temperatures; and the fuels under these circumstances must be roughly limited to organic materials which are susceptible of being decomposed by heat to yield at least one of the end products of the group consisting of carbon, hydrogen and carbon monoxide within a temperature range of approximately 600° to 1000° C. If one of the end products of the decomposing process is carbon, it is, of course, economically desirable to decompose within the cell electrode, since otherwise the carbon particles will be deposited outside of the electrode from whence they cannot enter and will not be consumed. This, however, is not essential since if the fuel is cheap enough it may be decomposed exteriorly of the cell although the decomposing proceeds uneconomically.

A somewhat different problem is presented where the decomposing is carried on outside of the fuel cell. In this case either a low temperature or high temperature cell employing either aqueous, non-aqueous or fused salt electrolytes may be used, since in any event no carbon can enter the cell should it be formed by the decomposing process. There is, of course, no limit to the decomposing temperature exteriorly of the cell, which is of advantage where the end products are, say, either hydrogen or carbon monoxide and no carbon is formed.

Thus, whether the fuel is to be decomposed interiorly or exteriorly of the cell will depend much on the nature of the fuel available and the economies that may or may not be involved. If the organic material breaks up into hydrogen and carbon monoxide it makes little difference whether the fuel is decomposed exteriorly or interiorly of the cell, except that in the latter case a notable saving in equipment is effected. Where, on the other hand, the fuel breaks up into carbon and hydrogen the process is preferably carried on within the cell electrode, since then the carbon will be consumed along with the hydrogen, which is desirable from an economic standpoint.

In Fig. 18 of the drawings there is disclosed a diagrammatic representation of an apparatus wherein decomposed fuels are supplied to a fuel cell and wherein the decomposing may be carried on either exteriorly or interiorly thereof, as desired. The fuel cell depicted therein is in every respect identical with that disclosed in Figs. 11, 12, 14 and 15 of the drawings and described under the caption "The fuel cell of low internal resistance." Hence, like reference characters have been employed to designate corresponding parts. The electrolyte 112 is taken, by way of example, as a fused salt electrolyte which dissociates into oxygen bearing anions, such as any of the mixtures set forth in the table on page 3 of the specification. An oxidizing gas is supplied the electrodes of positive polarity by the conduit 88 under the control of valves 93; and a fuel in either a gaseous or liquid form is furnished the remaining group of electrodes through the conduit 89 controlled by the valves 93. The pump 113 driven by a suitable prime mover 114 pumps the fuel from a storage tank 115 through the coil 116 of a vaporizer or cracking still under the control of the valves 117 to the conduit 89 for supply to the cell electrodes. The coil 116 is shown disposed within a furnace 118, which provides the necessary heat to dissociate the gaseous or liquid fuel. By closing the valves 117 and opening the valve 119 in the bypass conduit 120, the fuel may be supplied to the main conduit 89 for dissociating within the cell at cell temperatures.

For specifically illustrating the precise mode of operation of the apparatus in Fig. 18, let it be assumed that the fuel tank 115 contains a supply of either methyl alcohol or alternatively a supply of a butane-propane mixture known commercially as "Philgas." The operating temperature of the fused electrolyte 112 is adjusted to and maintained at approximately 800° C.

Methyl alcohol in the decomposing process dissociates into hydrogen and carbon monoxide. Since both of these end products are in a gaseous state it makes little or no difference whether the decomposing process is carried on exteriorly or interiorly of the cell. Where the decomposing is carried on exteriorly of the cell the valve 119 is closed and the valves 117 are in an open position so that the methyl alcohol may be pumped through the decomposing coil 116 of the vaporizer or decomposing still where the pyrolysis goes to completion with the formation of hydrogen and carbon monoxide. These gases are supplied by the conduit 89 to the various electrodes of the cell for electrochemical consumption therein.

If, on the other hand, the methyl alcohol is to be decomposed within the cell at cell temperature, the liquid is pumped through the bypass 120 into the main conduit 89 from whence it proceeds downwardly through the auxiliary conduits 91. As the methyl alcohol enters those portions of the auxiliary conduits that are surrounded by the fused electrolyte its temperature gradually rises as it proceeds in its downward path so that when it reaches the valves 94 vaporization has occurred. Thus the methyl alcohol enters the various electrode compartments in a vaporized state where the decomposing process is carried to completion.

If, instead of methyl alcohol, a butane-propane mixture forms the source of fuel in the supply tank 115 it will make a difference whether or not the fuel is decomposed exteriorly of the cell. Where the decomposing is carried on exteriorly of the cell the pyrolysis will go to completion in the decomposing coil 116 but only one of the end products of hydrogen and carbon can be utilized since the carbon will be deposited outside of the cell.

The preferred method, then, of decomposing fuels which yield as end products carbon and hydrogen, is to decompose them interiorly of the cell. Thus, by pumping the gaseous butane-propane mixture through the bypass 120 into the conduit 89 it can be introduced into the various electrode compartments at temperatures approaching the decomposing temperature because of the preheating of the mixture during its passage downwardly through the auxiliary conduits 91. The pyrolysis or decomposing of the butane-propane mixture is carried to completion within the electrode cavities yielding hydrogen and carbon both of which are thereupon electrochemically consumed. Where the decomposing process is carried on within the cell and yields carbon as one of the end products, it is important that the rates of fuel supply be adjusted so that the decomposing is carried to completion within the electrode cavity and not to completion within the auxiliary conduits 91. Otherwise the carbon will be precipitated in these conduits and of itself will not be able to enter the electrode for electrochemical consumption therein.

APPARATUS FOR SUPPLYING A FUEL CELL WITH COMMINUTED FUEL

In large installations constant replacement of large carbon electrodes such as shown in Fig. 17 would not be convenient. Hence, we have devised an alternative arrangement wherein comminuted carbonaceous material is utilized, the said material being preferably mixed with a suitable electrolyte and the resultant mixture supplied to one or more electrodes of a fuel cell for the electrochemical consumption thereat of the fuel suspended therein. Where the fuel supply is to be continuous in nature any residue in the fluid medium consequent upon combustion may be removed, and new fuel material mixed with the fluid medium for further combustion at the electrode. The comminuted carbonaceous fuel may be of any suitable nature. Thus, for example, pulverized or comminuated coke, coal, petroleum residues or other cheap pulverized forms of carbon may be employed. The electrode, or electrodes, into which the foregoing mixture is introduced are foraminous or porous and electrically conductive in character. Thus the mixture is completely enclosed in an electrically conductive porous cavity, the surfaces of which serve to carry off the electrical charges that are deposited there by electrochemical action.

In Figs. 19 and 20 of the drawings there is depicted a fuel cell which in every respect is identical with that disclosed in Figs. 11, 12, 14 and 15 and described under the caption "The fuel cell of low internal resistance" except that the two intermediate, horizontally arranged, compartment separating elements 75 in each of the electrodes of negative polarity are provided with perforations 121 at alternate ends so that the fuel electrolyte mixture may first circulate completely through one compartment before being introduced into the compartment next thereabove for a like circulation. Alternatively the fuel enriched electrolyte may be introduced simultaneously into several compartments and provision made to return the spent electrolyte to the header 131. There are, of course, no surface tension effects at the openings or foramina in the closures or facings 77 of the negative electrode, since the compartments 78 thereof are at all times filled with a mixture of electrolyte and pulverized carbonaceous material. Therefore, in this electrode there is no limitation as to the vertical height of the cell compartment. While the size of the openings in the facing 77 of the electrode of negative polarity is therefore not critical, it is preferred that the size be such as to substantially keep all the carbonaceous particles within the electrode cavity. In general the hydrodynamic resistance to outward flow of the carbonaceous bearing electrolyte through the electrode surface is adjusted to be notably greater than the resistance to circulation within the electrode. Like reference characters have been employed in Figs. 19 and 20 to designate corresponding parts of the fuel cell.

The fuel cell of Figs. 19 and 20 is of necessity of the high temperature type and preferably employs a fused electrolyte 122 which dissociates into oxygen bearing anions. By way of example, mixture VIII in the table appearing on page 3 of the specification is used. Oxidizing gas is supplied from the main conduit 88 to the electrodes of positive polarity. The system for supplying the electrodes of negative polarity with a mixture of electrolyte and powdered fuel includes a hopper or container 123, in which is placed comminuted carbonaceous material. The fuel is introduced by any suitable mixer 124 driven by a prime mover 125 into a fuel mixing chamber 126. This chamber contains a fused electrolyte, preferably of the character used in the fuel cell, and is maintained along with its associated conduits at a relatively high temperature so that the electrolyte therein will be preserved in its molten condition. The comminuted fuel is kept in suspension in the fused electrolyte of the mixing chamber by a suitable impeller contained therein and driven by a prime mover 127. The fluid mixture is forced by the pump 128 from the chamber 126 along the conduit 129 and enters the group of negative electrodes at the lower ends thereof through the auxiliary conduits 130. The electrolyte fuel mixture upon entering the bottom of each electrode of negative polarity is rich with carbonaceous materials as well as gas-forming materials. The oxygen bearing anions in the electrolyte adjacent the foraminous facings 77 oxidize this carbonaceous material leaving the facings negatively charged. As the comminuted carbonaceous fuel is oxidized as a result of its passage through the several electrode compartments 78 it is consumed; and the rates of flow are so adjusted that the effluent emerging through the auxiliary conduit 131 at the top of each electrode is one wherein any suspended residue is principally ash. By means of the main conduit 132 the effluent is transferred to the separating tank 133. In this tank the light ashes are floated off and discharged through a pipe 134 under the control of the valve 135. The sludge is settled and discharged through a waste pipe 136 controlled by the valve 137. The relatively clean electrolyte is then pumped out of the separating tank 133 by the pump 128 previously noted and forced through a filter 138, if deemed necessary, so that the electrolyte free of ashes and foreign material may be reutilized in the system for mixing the powdered fuel therein.

We have established by experiment that powdered carbonaceous fuel in suspension behind a foraminous electrically conductive closure is equivalent to the formed carbon electrode of Fig. 17. In a large installation where the processes of combustion must be more or less continuous the apparatus and method of Fig. 19 for securing combustion of solid material is of great importance.

According to the provisions of the patent statutes we have set forth the principle and mode of operation of our invention and have illustrated and described what we now consider to represent its best embodiments. However, we desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

We claim:

1. In a fuel cell, an electrode, said electrode comprising a foraminous reticulated electrically conductive body portion to which is secured at least one electrically conductive member for improving its rigidity and reducing its electrical resistance, an electrolyte disposed exteriorly of said electrode to form therewith an electrode electrolyte interface, an ionizable fuel gas electrochemically consumable at least in part disposed interiorly of said electrode and forming with the electrolyte an interface at foramina of the electrode, the said gas electrolyte interface being preserved and maintained in equilibrium by surface tension and the gas being electrochemically consumed at least in part at the electrode electrolyte interface.

2. A porous fuel cell electrode, comprising in combination a foraminous reticulated electrically conductive member to which is electrically bonded a foraminous electrically conductive sintered mass coextensive therewith, the said mass being provided with a catalytic coating for promoting gaseous ionization.

3. In a fuel cell, an electrode provided with a gas cavity, said electrode comprising a foraminous reticulated electrically conductive base member to which is electrically bonded a foraminous electrically conductive sintered mass, an electrolyte disposed exteriorly of said electrode, a gas disposed in said electrode cavity and forming with the electrolyte an interface at foramina of the sintered mass, the said gas electrolyte interface being preserved and maintained in equilibrium by surface tension.

4. A fuel cell electrode, comprising in combination a foraminous electrically conductive body portion provided with a gas cavity and electrically conductive means disposed within said cavity and secured to the body portion of the electrode for improving its rigidity and increasing the electrical conductivity thereof.

5. A fuel cell comprising in combination a casing, an electrolyte within said casing, electrodes of opposing polarity associated with said electrolyte, a plurality of serially connected electrodes disposed intermediate said electrodes of opposing polarity and cooperating therewith and with separate portions of the electrolyte to increase the electromotive force of the cell and means for supplying at least one of the aforesaid electrodes with an oxidizing gas, the said plurality of electrodes being in electrical communication solely within said cell.

6. A fuel cell comprising in combination a casing, an electrolyte within said casing, electrodes of opposing polarity associated with said electrolyte, a plurality of removably disposed serially connected electrodes intermediate said electrodes of opposing polarity and cooperating therewith and with separate portions of the electrolyte to increase the electromotive force of the cell and means for supplying at least one of the aforesaid electrodes with an oxidizing gas, the said plurality of electrodes being in electrical communication solely within said cell and being removable therefrom without destroying the operativeness of the cell.

7. A fuel cell comprising in combination a casing, an electrolyte within said casing, electrodes of opposing polarity associated with said electrolyte, a plurality of serially connected electrodes disposed intermediate said electrodes of opposing polarity and cooperating therewith and with separate portions of the electrolyte to increase the electromotive force of the cell, at least one of said plurality of electrodes being foraminous and having interiorly thereof a gas electrochemically consumable at least in part forming with the electrolyte exteriorly thereof an interface preserved by surface tension, the said plurality of electrodes being in electrical communication solely within said cell.

8. A fuel cell comprising in combination a casing, an electrolyte within said casing, electrodes of opposing polarity associated with said electrolyte, a plurality of removably disposed serially connected electrodes intermediate said electrodes of opposing polarity and cooperating therewith and with separate portions of the electrolyte to increase the electromotive force of the cell, at least one of said plurality of electrodes being foraminous and having interiorly thereof a gas electrochemically consumable at least in part forming with the electrolyte exteriorly thereof an interface preserved by surface tension, the said plurality of electrodes being in electrical communication solely within said cell and being removable therefrom without destroying the operativeness of the cell.

9. A fuel cell comprising in combination a casing, an electrolyte within said casing, electrodes of opposing polarity associated with said electrolyte, a plurality of serially connected electrodes disposed intermediate said electrodes of opposing polarity and cooperating therewith and with separate portions of the electrolyte to increase the electromotive force of the cell, the said plurality of electrodes being in electrical communication solely within said cell and including a common supporting member to at least one side of which there is secured foraminous means to form therewith a plurality of compartments, means for supplying said compartments with a gas electrochemically consumable at least in part, the gas within said compartments forming with the electrolyte exteriorly thereof an interface at foramina of said first mentioned means which is maintained in equilibrium by surface tension.

10. A fuel cell comprising in combination a casing, an electrolyte within said casing, electrodes of opposing polarity associated with said electrolyte, a plurality of removably disposed serially connected electrodes intermediate said electrodes of opposing polarity and cooperating therewith and with separate portions of the electrolyte to increase the electromotive force of said cell, the said plurality of electrodes being in electrical communication solely within said cell and including a common supporting member to at least one side of which there is secured foraminous means to form therewith a plurality of compartments, means for supplying said compartments with a gas electrochemically consumable at least in part, the gas within said compartments forming with the electrolyte exteriorly thereof an interface at foramina of said first mentioned means, the said gas electrolyte interface being preserved and maintained in equilibrium by surface tension and the height of each electrode compartment being such as to prevent the rupture of the interface with attendant escape of the gas from the compartment interior.

11. A fuel cell comprising in combination a casing, an electrolyte within said casing, a plurality of electrodes of opposing polarity associated with said electrolyte, each of said electrodes including an electrically conductive supporting member having extending therefrom in spaced relation electrically conductive elements, foraminous electrically conductive means secured to said elements and forming therewith and with said member compartments for the reception of a gas, means for supplying one of said electrodes with a gas electrochemically consumable at least in part, means for supplying another of said electrodes with a gas electrochemically consumable at least in part, the gas within each of said electrodes forming with the electrolyte exteriorly thereof an interface at foramina of said first mentioned means, the said gas electrolyte interface being preserved and maintained in equilibrium by surface tension.

12. A fuel cell comprising in combination a casing, an electrolyte within said casing, a plurality of electrodes of opposing polarity associated with said electrolyte, each of said electrodes including an electrically conductive supporting member having extending therefrom in spaced relation electrically conductive elements, foraminous electrically conductive means secured to said elements and forming therewith and with said member compartments for the reception of a gas, a unitary pair of serially connected electrodes disposed intermediate said plurality of electrodes for cooperation therewith and with separate portions of the electrolyte, said pair of electrodes including a common electrically conductive supporting member having extending from each side thereof in spaced relation electrically conductive elements, foraminous electrically conductive means secured to said elements and forming therewith and with said common supporting member compartments for the reception of a gas, means for supplying certain of said electrodes with a gas electrochemically consumable at least in part, means for supplying other of said electrodes with a gas electrochemically consumable at least in part, the gas within said electrodes forming with the electrolyte exteriorly thereof an interface at foramina of said first and second mentioned means, the said gas electrolyte interface being preserved and maintained in equilibrium by surface tension.

13. A fuel cell comprising in combination a casing, an electrolyte within said casing, a plurality of electrodes of opposing polarity associated with said electrolyte, each of said electrodes including an electrically conductive supporting member having extending therefrom in spaced relation electrically conductive elements, foraminous electrically conductive means secured to said elements and forming therewith and with said member compartments for the reception of a gas, a unitary pair of serially connected electrodes removably disposed intermediate said plurality of electrodes for cooperation therewith and with separate portions of the electrolyte, said pair of electrodes including a common electrically conductive supporting member having extending from each side thereof in spaced relation electrically conductive elements, foraminous electrically conductive means secured to said elements and forming therewith and with said common supporting member compartments for the reception of a gas, means for supplying certain of said electrodes with a gas electrochemically consumable at least in part, means for supplying other of said electrodes with a gas electrochemically consumable at least in part, the gas within said compartments forming with the electrolyte exteriorly thereof an interface at foramina of said first and second mentioned means, the said gas electrolyte interface being preserved and maintained in equilibrium by surface tension and the height of each electrode compartment being such as to prevent the rupture of the interface with attendant escape of the gas from the compartment interior.

14. A fuel cell comprising in combination a casing, an electrolyte within said casing, a plurality of electrodes of opposing polarity associated with said electrolyte, a unitary pair of serially connected electrodes disposed intermediate said plurality of electrodes for cooperation therewith and with separate portions of the electrolyte, said pair of electrodes including a common supporting member having elements extending from each side thereof in spaced relation, foraminous electrically conductive means secured to said elements on each side of the supporting member and forming therewith compartments for the reception of a gas, electrically conductive means extending through said supporting member and conductively secured to the foraminous means at both sides thereof, a gas electrochemically consumable at least in part within said compartments forming with the electrolyte exteriorly thereof an interface, the said gas electrolyte interface being preserved and maintained in equilibrium by surface tension.

15. A fuel cell comprising in combination a casing, an electrolyte within said casing which dissociates into oxygen bearing anions, a foraminous electrically conductive electrode associated with said electrolyte, means for supplying said electrode interiorly with an oxidizing gas, the said gas forming with the electrolyte exteriorly thereof an interface at foramina of the electrode which is preserved and maintained in equilibrium by surface tension, and a carbonaceous electrode associated with said electrolyte and cooperating with said first mentioned electrode.

16. A fuel cell comprising in combination a casing, an electrolyte within said casing including at least a carbonate of the alkali and/or alkaline earth metals, a foraminous electrically conductive electrode associated with said electrolyte, means for supplying said electrode interiorly with an oxidizing gas, the said gas forming with the electrolyte exteriorly thereof an interface at foramina of the electrode which is preserved and maintained in equilibrium by surface tension, and a carbonaceous electrode associated with said electrolyte and cooperating with said first mentioned electrode.

17. A fuel cell comprising in combination a casing, an electrolyte within said casing including at least a carbonate of the alkali metals, a foraminous electrically conductive electrode associated with said electrolyte, means for supplying said electrode interiorly with an oxidizing gas, the said gas forming with the electrolyte exteriorly thereof an interface at foramina of the electrode which is preserved and maintained in equilibrium by surface tension, and a carbonaceous electrode associated with said electrolyte and cooperating with said first mentioned electrode.

18. A fuel cell comprising in combination a casing, an electrolyte within said casing including at least a carbonate of the alkali metals, a foraminous electrically conductive electrode associated with said electrolyte, means for supplying said electrode interiorly with an oxidizing gas, the said gas forming with the electrolyte exteriorly thereof an interface at foramina of the electrode which is preserved and maintained in equilibrium by surface tension and a foraminous electrically conductive electrode likewise associated with said electrolyte and having disposed interiorly thereof a comminuted carbonaceous material for electrochemical consumption within said cell.

19. A fuel cell comprising in combination a casing, an electrolyte within said casing which dissociates into metal bearing cations and oxygen bearing anions, a foraminous electrically conductive electrode associated with said electrolyte, means for supplying said electrode interiorly with an oxidizing gas and with a depolarizing gas of carbon dioxide, the said gas forming with the electrolyte exteriorly thereof an interface at foramina of the electrode which is preserved and maintained in equilibrium by surface tension, and a second electrode of opposing polarity associated with said electrolyte and cooperating with said first mentioned electrode.

20. A fuel cell comprising in combination a casing, an electrolyte within said casing, a plurality of electrodes of opposing polarity associated with said electrolyte at least one of which is foraminous, and an electrolyte carrying in suspension a comminuted carbonaceous material for electrochemical consumption within said cell and disposed interiorly of said foraminous electrode.

21. A fuel cell comprising in combination a casing, an electrolyte within said casing which dissociates into oxygen bearing anions, a plurality of foraminous electrically conductive electrodes associated with said electrolyte, an oxidizing gas disposed interiorly of one of said electrodes and forming with the electrolyte exteriorly thereof an interface at foramina of the electrode preserved by surface tension, and an electrolyte carrying in suspension a comminuted carbonaceous material for electrochemical consumption within said cell and disposed interiorly of another of said electrodes.

22. An electrochemical apparatus comprising in combination a casing, an electrolyte within said casing which dissociates into oxygen bearing anions, a plurality of electrodes associated with said electrolyte at least one of which is foraminous, means for supplying an oxidizing gas to one of said electrodes and means for supplying the interior of a foraminous electrode with an electrolyte carrying in suspension a comminuted carbonaceous material for electrochemical consumption within said cell.

23. An electrochemical apparatus comprising in combination a casing, a fused electrolyte within said casing including at least a carbonate of the alkali and/or alkaline earth metals, a plurality of electrodes associated with said electrolyte at least one of which is foraminous, means for supplying an oxidizing gas to one of said electrodes and means for supplying the interior of a foraminous electrode with an electrolyte carrying in suspension a comminuted carbonaceous material for electrochemical consumption within said cell.

24. An electrochemical apparatus comprising in combination a casing, an electrolyte within said casing which dissociates into oxygen bearing anions, a plurality of electrodes associated with said electrolyte at least one of which is foraminous, means for supplying an oxidizing gas to one of said electrodes and means for continuously supplying the interior of a foraminous electrode with an electrolyte carrying in suspension a comminuted carbonaceous material for electrochemical consumption within said cell.

25. An electrochemical apparatus comprising in combination a casing, an electrolyte within said casing which dissociates into oxygen bearing anions, a plurality of electrodes associated with said electrolyte at least one of which is foraminous, means for supplying an oxidizing gas to one of said electrodes and a system operable to continuously supply the interior of a foraminous electrode with an electrolyte carrying in suspension a comminuted carbonaceous material, the said system including a source of comminuted carbonaceous material, means for mixing the electrolyte and material and means for removing from the electrolyte any residue consequent upon the combustion of the material within the casing.

26. A method of supplying an electrode of a fuel cell with comminuted fuel for electrochemical combustion thereat which comprises the steps of mixing a comminuted carbonaceous fuel material with a fluid electrolyte and supplying the said electrode with the resultant mixture for the electrochemical combustion of the fuel material suspended therein.

27. A method of supplying an electrode of a fuel cell with comminuted fuel which comprises the steps of mixing a comminuted carbonaceous fuel material with a fluid electrolyte, supplying the resultant mixture to the said electrode for the electrochemical combustion thereat of the material suspended therein, and removing the said fluid electrolyte from the vicinity of the electrode with any residue that may be suspended therein after electrochemical combustion.

28. A method of supplying an electrode of a fuel cell with comminuted fuel which comprises the steps of mixing a comminuted carbonaceous fuel material with a fluid electrolyte, circulating the resultant mixture to the said electrode for the electrochemical combustion thereat of the fuel material suspended therein, removing from the fluid electrolyte any residue therein consequent upon the aforesaid combustion, and again mixing with the fluid electrolyte comminuted carbonaceous fuel material for further combustion at the electrode.

29. A hollow gas fuel cell electrode, comprising in combination a foraminous electrically conductive body portion, means disposed within the hollow electrode for increasing the path of gas flow, and means through which gas may be supplied to the hollow electrode and through which any unconsumed portion of the gas may be vented, the electrode body portion including a foraminous reticulated electrically conductive member to which is electrically bonded a foraminous electrically conductive sintered mass.

30. A hollow gas fuel cell electrode, comprising in combination a foraminous electrically conductive body portion, electrically conductive means disposed within the hollow electrode and secured to the walls thereof for increasing the path of gas flow, and means through which gas may be supplied to the hollow electrode and through which any unconsumed portion of the gas may be vented, the electrode body portion including a foraminous reticulated electrically conductive member to which is electrically bonded a foraminous electrically conductive sintered mass.

ROSS GUNN.
WAYNE C. HALL.